(12) United States Patent
Jin et al.

(10) Patent No.: US 10,265,793 B2
(45) Date of Patent: Apr. 23, 2019

(54) SIDE PANEL HOME-POSITIONING JIG FOR ROOF LASER-BRAZING SYSTEM

(71) Applicants: HYUNDAI MOTOR COMPANY, Seoul (KR); KIA MOTORS CORPORATION, Seoul (KR)

(72) Inventors: Taeheun Jin, Gyeongsan-si (KR); Minsun Sim, Incheon (KR); Jeongho Choi, Busan (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 568 days.

(21) Appl. No.: 14/947,679

(22) Filed: Nov. 20, 2015

(65) Prior Publication Data

US 2017/0029052 A1    Feb. 2, 2017

(30) Foreign Application Priority Data

Jul. 31, 2015    (KR) .................. 10-2015-0108920

(51) Int. Cl.
*B23K 1/00*    (2006.01)
*B23K 3/08*    (2006.01)
(Continued)

(52) U.S. Cl.
CPC .......... *B23K 1/0056* (2013.01); *B23K 1/0008* (2013.01); *B23K 3/087* (2013.01);
(Continued)

(58) Field of Classification Search
CPC .............. B23K 2201/006; B23K 3/087; B23K 37/0443; B23K 37/047;
(Continued)

(56) References Cited

U.S. PATENT DOCUMENTS

| 4,404,451 | A | * | 9/1983 | Niikawa | B23K 37/047 |
| | | | | | 219/161 |
| 4,885,883 | A | * | 12/1989 | Wright | E04B 1/2604 |
| | | | | | 403/172 |
| 5,174,488 | A | * | 12/1992 | Alborante | B23K 37/047 |
| | | | | | 228/4.1 |
| 6,355,906 | B1 | * | 3/2002 | Okuno | B23K 26/0838 |
| | | | | | 219/121.6 |

(Continued)

FOREIGN PATENT DOCUMENTS

| JP | 6-11694 | 3/1994 |
| KR | 10-2009-0043181 | 5/2009 |

(Continued)

*Primary Examiner* — Tyrone V Hall, Jr.
(74) *Attorney, Agent, or Firm* — Brinks Gilson & Lione

(57) ABSTRACT

A side panel home-positioning jig is configured to hold and home-position an opposite side panel of a body in a roof laser-brazing system, the roof laser-brazing system configured with a predetermined brazing section and a predetermined grinding section along a transferring path of the body and configured to bond a roof panel to opposite side panels based on the body that includes the opposite side panels. The side panel home-positioning jig includes: a base frame configured to be installed in the brazing section at one of opposite sides of the transferring path between which the transferring path extends; a moving frame configured to be reciprocally and slidably movable in a width direction of the body; a post frame disposed in a direction perpendicular to opposite sides of the moving frame; a support frame installed at the post frame along a length direction of the opposite side panels; and a plurality of clampers mounted on the support frame along the transfer direction of the body, the plurality of clampers configured to be reciprocally movable in the width direction of the body, and to hold the opposite side panels.

10 Claims, 23 Drawing Sheets

(51) Int. Cl.
  *B23K 1/005*    (2006.01)
  *B23K 26/03*    (2006.01)
  *B23K 26/08*    (2014.01)
  *B23K 37/04*    (2006.01)
  *B23K 101/00*   (2006.01)
  *B23K 101/18*   (2006.01)
  *B23K 37/047*   (2006.01)

(52) U.S. Cl.
  CPC ........ *B23K 26/032* (2013.01); *B23K 26/0838* (2013.01); *B23K 26/0884* (2013.01); *B23K 37/047* (2013.01); *B23K 37/0443* (2013.01); *B23K 2101/006* (2018.08); *B23K 2101/18* (2018.08)

(58) Field of Classification Search
  CPC ..... B62D 65/024–65/028; B62D 65/06; B62D 65/16
  See application file for complete search history.

(56) References Cited

U.S. PATENT DOCUMENTS

| 2008/0226427 | A1* | 9/2008 | Van Zile | B23K 37/0443 414/14 |
| 2011/0265301 | A1* | 11/2011 | Kilibarda | B23K 37/047 29/407.01 |
| 2012/0030924 | A1* | 2/2012 | Kilibarda | B62D 65/026 29/525.01 |
| 2012/0102711 | A1* | 5/2012 | Ali | B23P 19/10 29/429 |
| 2012/0125974 | A1* | 5/2012 | Kwon | B23K 11/11 228/8 |
| 2013/0145874 | A1* | 6/2013 | Yeum | B25B 5/006 74/405 |

FOREIGN PATENT DOCUMENTS

| KR | 10-2009-0063998 | 6/2009 |
| KR | 10-2012-0059986 | 6/2012 |

* cited by examiner

SIDE PANEL HOME-POSITIONING JIG FOR ROOF LASER-BRAZING SYSTEM

CROSS-REFERENCE TO RELATED APPLICATION

This application claims priority to Korean Patent Application No. 10-2015-0108920 filed on Jul. 31, 2015, in the Korean Intellectual Property Office, the entire contents of which is incorporated herein by reference.

FIELD

The present disclosure relates to a vehicle body assembly system. More particularly, the present disclosure relates to a roof laser-brazing system that assembles side panels and a roof panel of a vehicle body.

BACKGROUND

Generally, a vehicle body is formed as a body in white (BIW) through a vehicle body assembly process of assembling various panels produced in vehicle body sub-processes.

A vehicle body includes a floor panel forming a lower side of a frame of the body, opposite side panels forming left and right sides of the frame, a roof panel forming an upper side of the frame, a plurality of roof rails, a cowl panel, a back panel, a package tray, etc. Assembling of such parts of the vehicle body is performed in a main buck process (referred to as a vehicle body build-up process in the industry).

In the main buck process, after the back panel is bonded to the floor panel through a vehicle body assembly system, the opposite side panels, the roof panel, the roof rail, the cowl panel, the package tray, etc. are welded and assembled.

The vehicle body assembly system sets the side panels to the floor panel by holding the side panels by a side hanger and a side gate, and after the system sets the roof panel, the roof rail, the cowl panel, the package tray, etc. to the side panel, their bonding portions are welded by a welding robot.

In the vehicle body assembly process, after the roof panel is welded to the side panels by spot-welding, a roof molding made of resin is attached to the welded portions of the side panels and the roof panel.

However, since the roof molding is attached to the welded portions of the side panels and the roof panel in the conventional art, appearance thereof is not good, and material costs and labor costs may increase due to attachment of the roof molding.

The above information disclosed in this Background section is only to enhance the understanding of the background of the disclosure and therefore it may contain information that is not prior art already known a person of ordinary skill in the art.

SUMMARY

The present disclosure has been made in an effort to provide a home-positioning jig that home-positions and holds opposite side panels in a roof laser-brazing system, and that can eliminate need for a roof molding, by laser-brazing portions between a side panel and a roof panel.

A side panel home-positioning jig is configured to hold and home-position an opposite side panel of a body in a roof laser-brazing system, the roof laser-brazing system configured with a predetermined brazing section and a predetermined grinding section along a transferring path of the body the roof and configured to bond a roof panel to opposite side panels based on the body that includes the opposite side panels, and the side panel home-positioning jig comprises: a base frame configured to be installed in the brazing section at one of opposite sides of the transferring path between which the transferring path extends; a moving frame configured to be reciprocally and slidably movable in a width direction of the body; a post frame disposed in a direction perpendicular to opposite sides of the moving frame; a support frame installed at the post frame along a length direction of the opposite side panels; and a plurality of clampers that are mounted on the support frame along the transfer direction of the body, the plurality of clampers configured to be reciprocally movable in the width direction of the body, and to hold the opposite side panel.

The side panel home-positioning jig may be configured to home-position the opposite side panel based on a matching gap between the roof panel and the opposite side panel, and thereby ensure zero gap between the opposite side panel and the roof panel.

The moving frame may be configured to be slidably movable in a plurality of guide rails provided in the base frame.

The first driving part may include a first servo motor fixedly mounted on the base frame; and a lead screw that is connected to the first servo motor and is substantially threadedly-attached to the moving frame.

The support frame may be rotatably installed at the post frame through the drive motor.

The clampers may be configured to be reciprocally movable in the width direction of the body by a second driving part provided in the support frame.

The second driving part may include: a second servo motor installed at the support frame; and a linear motion (LM) guide that is connected to the second servo motor, fixes the clamper, and is configured to be reciprocally movable in the width direction of the body by the second servo motor.

A fixing pin configured to fix the roof-pressing jig for pressing the roof panel may be installed at the post frame.

A pin clamper configured to restrict a pin connection portion of the roof-pressing jig may be installed at the post frame.

A support bracket configured to dock with the roof-pressing jig may be installed at the post frame.

The fixing pin and the pin clamper may be installed at the support bracket.

According to an exemplary form of the present disclosure, by laser-brazing bonding portions between each of the opposite side panels of the body and the roof panel, it is possible to eliminate a need for a roof molding of the conventional art.

Further, according to an exemplary form of the present disclosure, by omitting the roof molding it is possible to improve appearance of the body of the vehicle, reduce material costs, and reduce labor costs associated with mounting of the roof molding of the conventional art.

Further, according to an exemplary form of the present disclosure, it is possible to further improve the brazing quality, because the roof panel is home-positioned and held to the opposite side panels by the roof-pressing jig, the gaps between the opposite side panels and the roof panel are zeroed by the side panel home-positioning jig and the gap measurement unit, the opposite side panels and the roof panel are laser-brazed, and grinding defects of the brazing-beads are automatically detected by the bead inspection unit.

Further, according to an exemplary form of the present disclosure, because the roof panel 5 may be laser-brazed corresponding to the bodies of various kinds of vehicles, it is possible to flexibly produce various kinds of vehicles, to reduce equipment-preparing time, to achieve a weight reduction and simplification of entire equipment, and to reduce initial investment and additional investment for additional vehicles.

DRAWINGS

The drawings are intended to be used as references for describing exemplary forms of the present disclosure, and the accompanying drawings should not be construed as limiting the technical spirit of the present disclosure.

FIG. 1 schematically illustrates a block diagram of a roof laser-brazing system.

DETAILED DESCRIPTION

Figure 1:
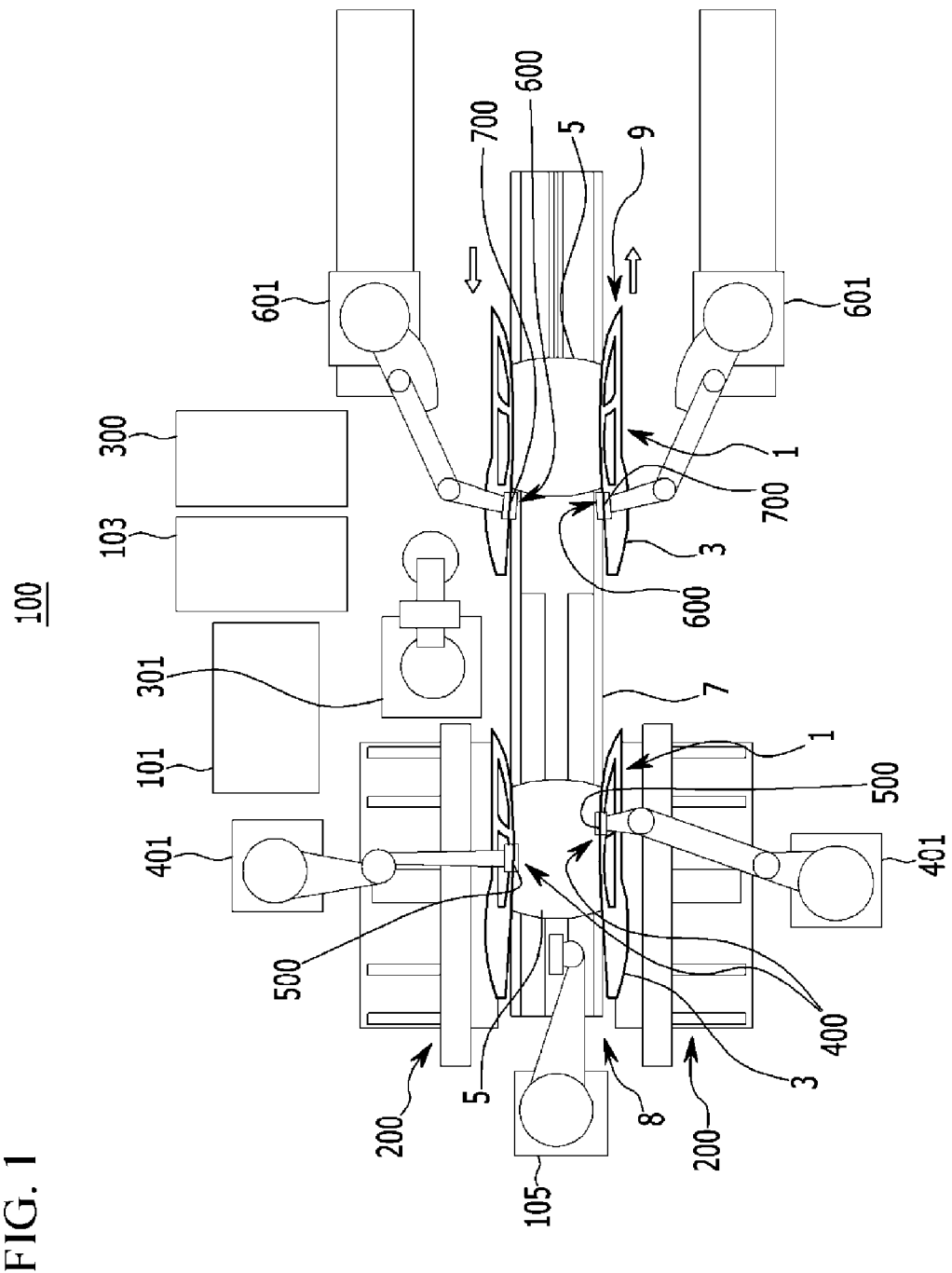

The present disclosure will be described more fully hereinafter with reference to the accompanying drawings, in which exemplary forms of the disclosure are shown. As those skilled in the art would realize, the described forms may be modified in various different ways, all without departing from the spirit or scope of the present disclosure.

Accordingly, the drawings and description are to be regarded as illustrative in nature and not restrictive. Like reference numerals designate like elements throughout the specification.

The size and thickness of each configuration shown in the drawings are arbitrarily shown for understanding and ease of description, but the present disclosure is not limited thereto and in the drawings, the thickness of layers, films, panels, regions, etc., may be exaggerated for clarity.

In the following description, discrimination of the names of components by "the first," "the second," etc. is for discriminating them based on the same relationship of the components, and the components are not limited to the order used in the following description.

Throughout the specification, unless explicitly described to the contrary, the word "comprise" and variations such as "comprises" or "comprising," will be understood to imply the inclusion of stated elements but not the exclusion of any other elements.

Further, the terms, " . . . unit", " . . . mechanism", " . . . portion", " . . . member" etc. used herein mean a unit of inclusive components performing at least one or more functions or operations.

In FIG. 1, a roof laser-brazing system 100 holds main buck assembly parts with a jig and welds them, and it may be applied to a main buck process of a vehicle body assembly line that assembles a vehicle body.

Further, the roof laser-brazing system 100 may be applied to a process of bonding a roof panel 5 to opposite side panels 3, based on a body 1 that includes the opposite side panels 3, in the main buck process of the vehicle body assembly line.

Here, the body 1 may be one in which the opposite side panels 3 are assembled to a predetermined structure, for example, one in which the side panels 3 are assembled to opposite sides of a floor panel (not shown). The body 1 may be transferred along a transfer line 7 by a carriage (not shown).

In the industry, a width direction of the body 1 is typically referred to as an L direction, a transfer direction of the body 1 as a T direction, and a height direction of the body 1 as an H direction. However, in the present disclosure, references to the directions are not described according to the LTH directions but are described as a width direction, a transfer direction, and a height direction of the body.

The roof laser-brazing system 100 is configured as a structure in which portions at which the opposite side panels 3 and the roof panel 5 of the body 1 are bonded together are bonded by a laser-brazing method, so that a roof molding may be omitted.

The roof laser-brazing system 100 may be configured with a predetermined brazing section 8 and a predetermined grinding section 9 along a transfer path of the body 1.

The roof laser-brazing system 100 may be configured to, by the laser-brazing method in the brazing section 8, bond the bonding portions between the opposite side panels 3 and the roof panel 5 of the body 1.

The roof laser-brazing system 100 may be configured to, in the grinding section 9, grind brazing-beads of the brazing portions between the opposite side panels 3 and the roof panel 5.

The roof laser-brazing system 100 includes side panel home-positioning jigs 200, a roof-pressing jig 300, a brazing assembly 400, a gap measurement unit 500, a grinding assembly 600, and a bead inspection unit 700.

The above-described components may be totally installed in one process frame in the vehicle body assembly line of the main buck process, or may be separately installed in divided process frames therein.

In an exemplary form of the present disclosure, the side panel home-positioning jigs 200 are configured to hold the opposite side panels 3 of the body 1 so that the opposite side panels 3 are positioned at predetermined positions. The side panel home-positioning jigs 200 are configured in the brazing section 8 and are installed at opposite sides of a transfer path of the body 1.

The side panel home-positioning jigs 200 may be configured to, based on a body 1 of a predetermined type of vehicle that is transferred to the brazing section 8 of the transfer path of the transfer line 7, clamp the opposite side panels 3 of the body 1, and to position the opposite side panels 3 at a predetermined position, which is a home position.

The side panel home-positioning jigs 200 may be configured to hold the opposite side panels 3 to correspond to bodies 1 of different kinds of vehicles, and to home-position the opposite side panels 3 at a predetermined position based on a gap value between the side panels 3 and the roof panel 5 measured by a gap measurement unit 500 (which will be described in detail later).

The term, "home position" may be defined as a position at which the gap between the opposite side panels 3 and the roof panel 5 becomes zero as the opposite side panels 3 are smoothly moved by the side panel home-positioning jigs 200 in the width direction of the body 1.

For example, the side panel home-positioning jigs 200 are configured to hold the opposite side panels 3 and to home-position the opposite side panels 3 based on gap values measured by the gap measurement unit 500, thereby ensuring a zero gap between each of the opposite side panels 3 and the roof panel 5. The term "holding" may include clamping the opposite side panels 3.

In an exemplary form of the present disclosure, side panel home-positioning jigs 200 are provided at opposite sides of the transfer path, with the transfer path of the body 1 passing between the opposite sides of the transfer path. However, only one side panel home-positioning jig 200, installed at one side of the transfer path, will now be described.

Figure 2:
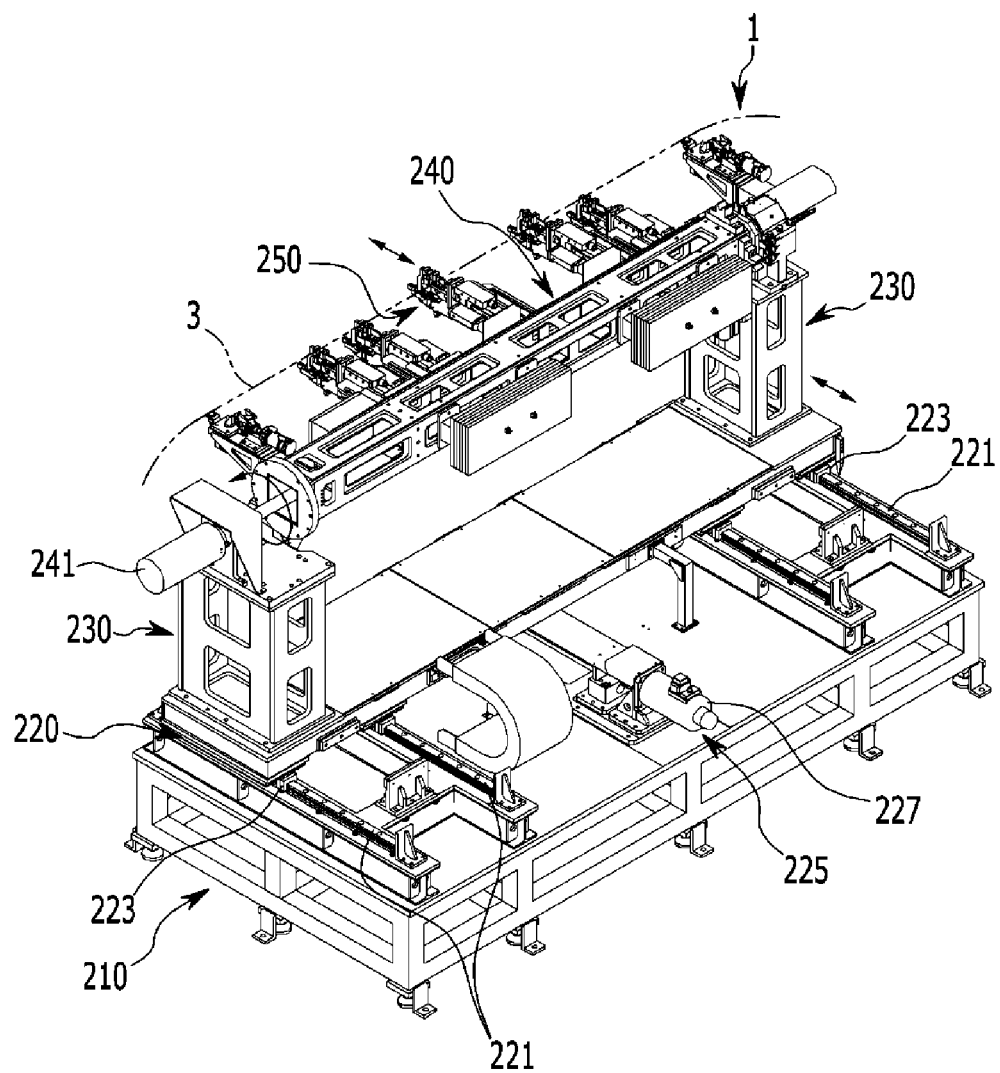
FIGS. 2 to 4 are drawings illustrating a side panel home-positioning jig for use with a roof laser-brazing system.
Figure 3:
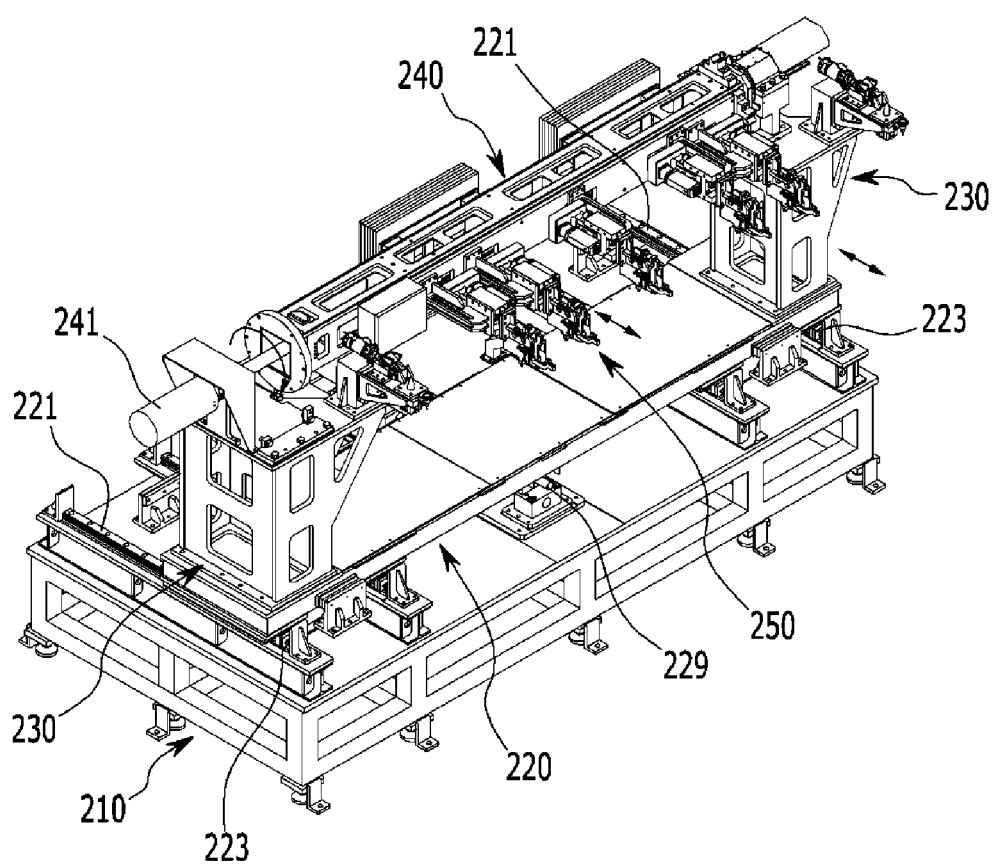
Figure 4:
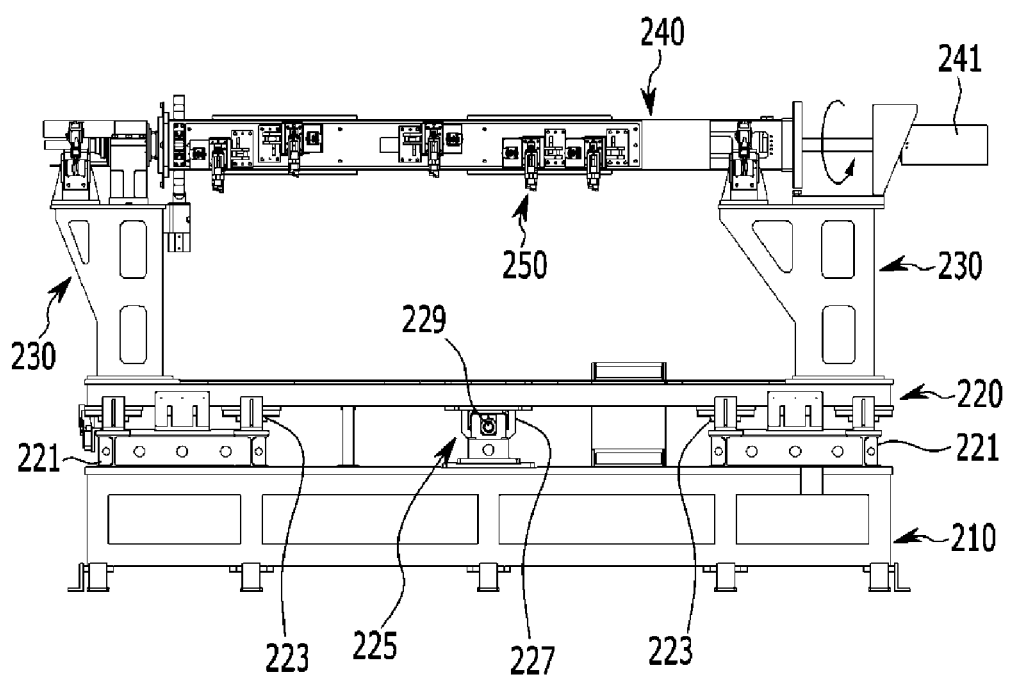

In FIGS. 2 to 4, a side panel home-positioning jig 200 includes a base frame 210, a moving frame 220, a post frame 230, a support frame 240, and clampers 250.

The base frame 210 is provided to support the moving frame 220, the post frame 230, and the support frame 240, and is installed at one of the opposite sides of the transfer path between which the transfer path extends in the brazing section 8.

The base frame 210 includes sub-elements such as various brackets, support blocks, plates, housings, covers, collars, and the like for supporting the moving frame 220. Because the sub-elements are configured to install the moving frame 220 in the base frame 210, except for an exceptional case, the sub-elements are generally referred to as the base frame 210 in an exemplary form of the present disclosure.

The moving frame 220 is installed at the base frame 210 to be reciprocally movable in the width direction of the body 1. The moving frame 220 is installed to be slidingly movable on a plurality of guide rails 221 provided in the base frame 210.

The guide rails 221 are spaced apart from each other by a predetermined distance along the transfer direction of the body 1, are installed on a top surface of the base frame 210, and extend in the width direction of the body 1. Sliders 223 are installed on a bottom surface of the moving frame 220. Each slider 223 is slidably coupled to a guide rail 221.

A first driving part 225 for reciprocally moving the moving frame 220 in the width direction of the body 1 is installed at the base frame 210. The first driving part 225 is configured to be able to convert rotational motion of a motor into linear motion of the moving frame 220.

The first driving part 225 includes a first servo motor 227 that is installed at the base frame 210 and a lead screw 229 that is connected to the first servo motor 227 and is substantially threadedly-attached to the moving frame 220.

The first servo motor 227 may be fixedly mounted on a top surface of the base frame 210. The lead screw 229 may be connected to a drive shaft of the first servo motor 227, and may be threadedly-attached to a predetermined block (not shown) fixed to the bottom surface of the moving frame 220.

The post frame 230 is installed at each of the opposite sides of the moving frame 220 along the transfer direction of the body 1, and it is fixedly mounted in a vertical direction of the moving frame 220.

As a frame for substantially supporting clampers 250 (which will be described later), the support frame 240 extends along a length direction of the opposite side panels 3, that is, along the transfer direction of the body 1, and is connected to the post frame 230.

The clampers 250 are configured to hold the opposite side panels 3 and to home-position the opposite side panels 3 based on the gap value measured by the gap measurement unit 500.

The clampers 250 are provided in plural, mounted on the support frame 240 along the transfer direction of the body 1, and are configured to be reciprocally movable in the width direction of the body 1.

Figure 5:
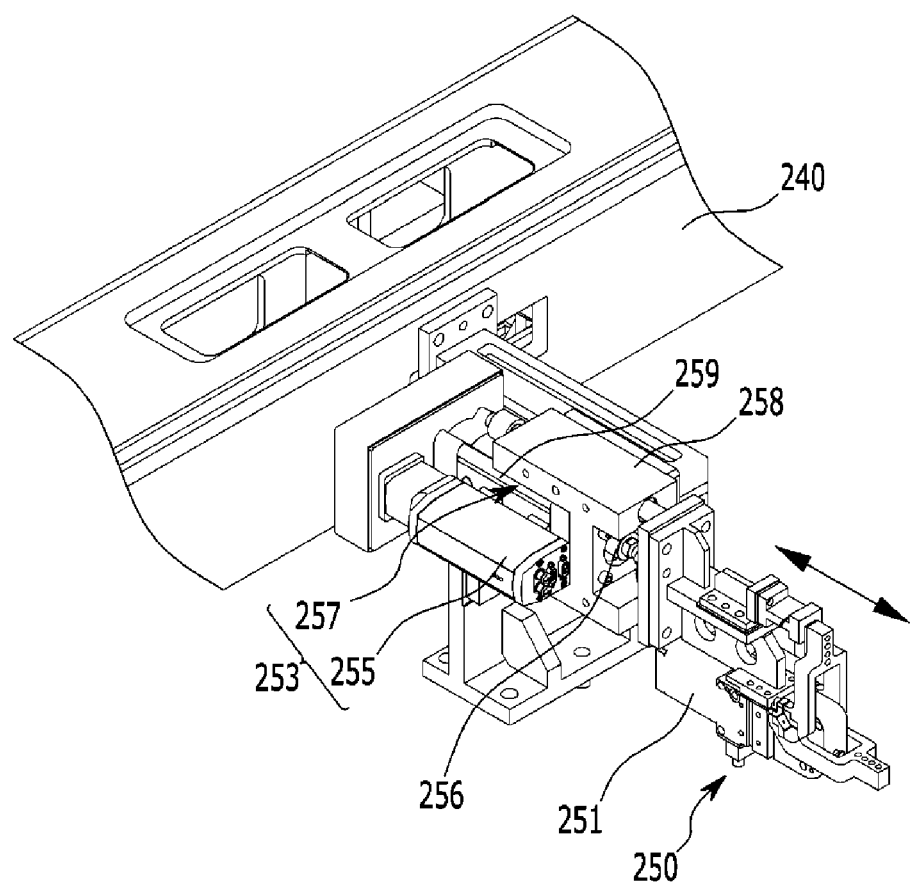
FIG. 5 illustrates a perspective view of a clamper of a side panel home-positioning jig for use with a roof laser-brazing system.

As a clamper for holding upper sides of the opposing side panels 3, the clamper 250, as shown in FIG. 5, may be operated by a clamp cylinder 251 and may clamp the upper sides of the opposite side panels 3. Since the clamper 250 may be configured as a clamping device based on the well-known disclosed technologies in the art, a detailed description thereof will be omitted in the present specification.

As described above, the clamper 250 is configured to be reciprocally movable in the width direction of the body 1 at the support frame 240, and for this purpose, a second driving part 253, configured for reciprocally moving the clamper 250 in the width direction of the body 1, is provided in the support frame 240.

The second driving part 253 includes a second servo motor 255 that is installed at the support frame 240 and a linear motion (LM) guide 257 that is connected to the second servo motor 255 and fixes the clamper 250.

The second servo motor 255 is fixedly installed at the support frame 240. The LM guide 257 is configured to receive the torque of the second servo motor 255 and to reciprocally move the clamper 250 in the width direction of the body 1 by the received torque.

The LM guide 257 may be connected to the second servo motor 255 through a power transmission unit such as a belt or a gear. The LM guide 257 includes a ball screw 256 connected to the drive shaft of the second servo motor 255, a moving block 258 threadedly-attached to the ball screw 256 and connected to the clamper 250, and a rail member 259 slidably coupled to the moving block 258.

The clamper 250 may be linearly and reciprocally moved in the width direction of the body 1 through the LM guide 257 by rotating the second servo motor 255 in a forward or reverse direction.

The clamper 250 is configured to be reciprocally movable in the width direction of the body 1 through the second driving part 253 in order to smoothly move the opposite side panels 3 in the width direction of the body 1 while holding the opposing side panels 3 with the clamper 250.

For example, while holding the opposite side panels 3, the clamper 250 may smoothly move the opposite side panels 3 in the width direction of the body 1 using the second driving part 253, based on the gap value measured by the gap measurement unit 500, such that the gap between the side panels 3 and the roof panel 5 may be set to be zero.

In an exemplary form, as described above, the moving frame 220, being configured to be reciprocally movable in the width direction of the body 1 through the first driving part 225, moves the clampers 250 to predetermined positions corresponding to bodies 1 of different kinds of vehicles.

In an exemplary form, the support frame 240, on which the clampers 250 are mounted, may be rotatably installed at the post frame 230 through a drive motor 241.

The support frame 240 is rotatably supported by the post frame 230 and may be rotated by the drive motor 241. The drive motor 241 may be fixedly installed to the post frame 230 with a bracket.

The support frame 240 is configured to be rotatably installed at the post frame 230 through the drive motor 241 in order to allow for selective use of clampers 250 with different structures corresponding to bodies 1 of different kinds of vehicles, depending on the corresponding vehicle.

Here, the clampers 250 may have different structures corresponding to the bodies 1 of respective kinds of vehicles, to be able to respectively hold the opposite side panels 3 of different kinds of vehicles, and may be installed at any side or at least one side of the support frame 240.

For example, the clampers 250 corresponding to one kind of vehicle are installed at one side of the support frame 240 along the transfer direction of the body 1, and the clampers 250 corresponding to each of different kinds of vehicles may be installed at another side of the support frame 240 along the transfer direction of the body 1.

Since the support frame 240 is configured to be rotated by the drive motor 241, the clampers 250 with different structures corresponding to the bodies 1 of different kinds of vehicles are disposed at the side of opposite side panels 3 of the corresponding kind of vehicle.

Figure 6:
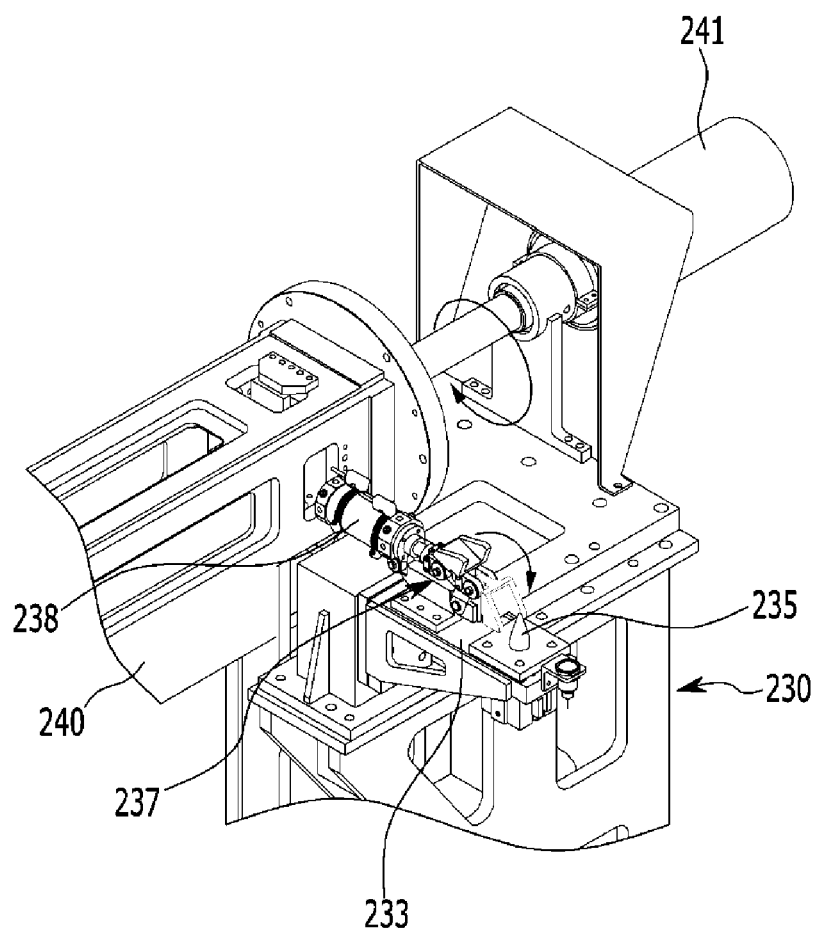
FIG. 6 illustrates a perspective view of a fixing pin of a side panel home-positioning jig for use with a roof laser-brazing system.

In FIG. 6, a support bracket 233, configured for docking with a roof-pressing jig 300 (refer to FIG. 1) that will be further described later, is installed at each post frame 230.

A fixing pin 235, that is configured to be coupled to the roof-pressing jig 300 to fix the roof-pressing jig 300, is installed at the support bracket 233. The fixing pin 235 of the support bracket 233 may be inserted into a docking portion of the roof-pressing jig 300.

A pin clamper 237 configured to hold a pin connection portion or docking portion of the roof-pressing jig 300 is installed at the support bracket 233 of the post frame 230. When the fixing pin 235 is coupled to the docking portion of the roof-pressing jig 300, the pin clamper 237 may hold the fixing pin 235 together with the pin connection portion of the roof-pressing jig.

Here, the pin clamper 237 may rotate due to operation of a pin clamping cylinder 238, and may hold the fixing pin 235 together with the pin connection portion of the roof-pressing jig 300 by an operating pressure of the pin clamping cylinder 238.

In FIG. 1, in an exemplary form of the present disclosure, the roof-pressing jig 300 is configured to home-position the roof panel 5 loaded on the opposite side panels 3 of the body 1, and to press the roof panel 5 with a handling robot 301. The roof-pressing jig 300 is detachably installed at the handling robot 301, and is configured to be able to be docked to the aforementioned side panel home-positioning jig 200.

Here, the roof panel 5 may be aligned in a roof alignment jig 101, unloaded from the roof alignment jig 101 by a roof loading jig 103, and loaded on the opposite side panels 3 of the body 1.

The roof alignment jig 101 is configured to align the roof panel 5 at a predetermined position, and is installed between the brazing section 8 and the grinding section 9. The roof loading jig 103 is detachably installed at the aforementioned handling robot 301.

The roof alignment jig 101 includes a reference pin configured for holding a reference position of the roof panel 5 and retainers configured for supporting edges of the roof panel 5. The roof loading jig 103 includes a reference pin configured for holding the reference position of the roof panel 5 and clampers configured for holding the edges of the roof panel 5.

Since configurations of the roof alignment jig 101 and the roof loading jig 103 are well known in the art, a detailed description thereof will be omitted in the present specification.

The handling robot 301 may change tools of the roof loading jig 103, the roof-pressing jig 300, and a spot-welding gun (not shown) using a tool-changer.

Reference number 105, which is shown in FIG. 1, denotes a welding robot in which the spot welding gun is mounted and which spot-welds the roof panel 5 and the front and rear roof rails. The welding robot 105 is provided in the brazing section 8.

Figure 7:
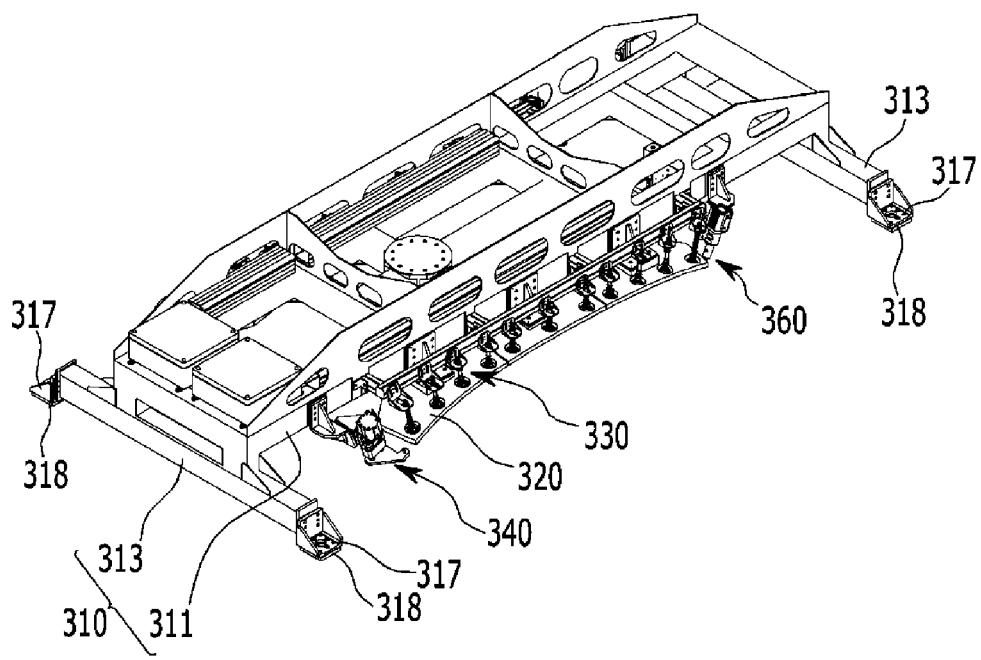
FIGS. 7 to 9 are drawings of illustrating a roof-pressing jig for use with a roof laser-brazing system.
Figure 8:
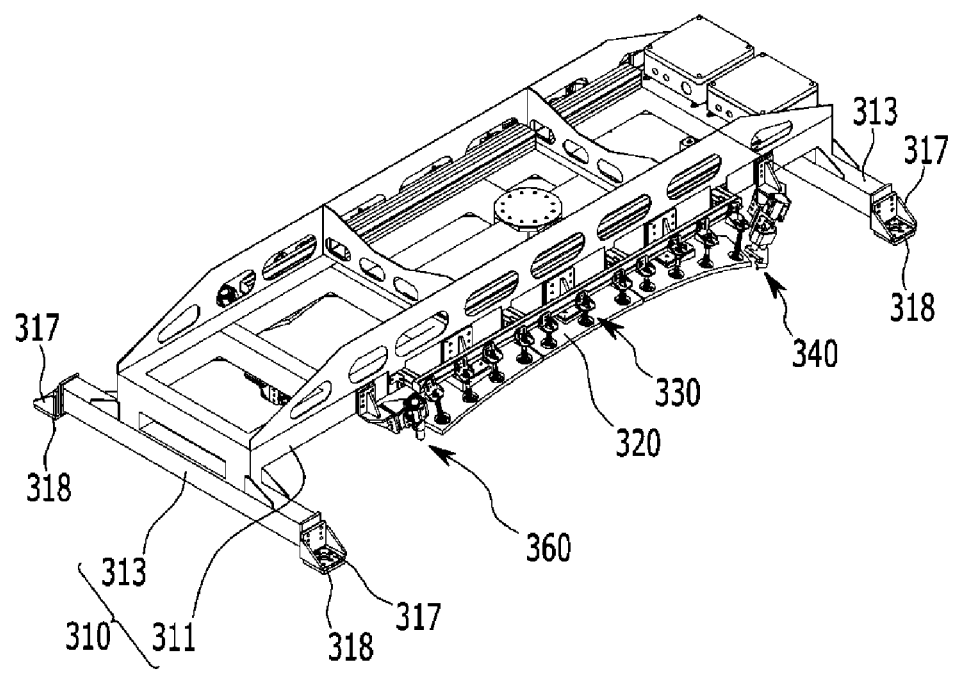
Figure 9:
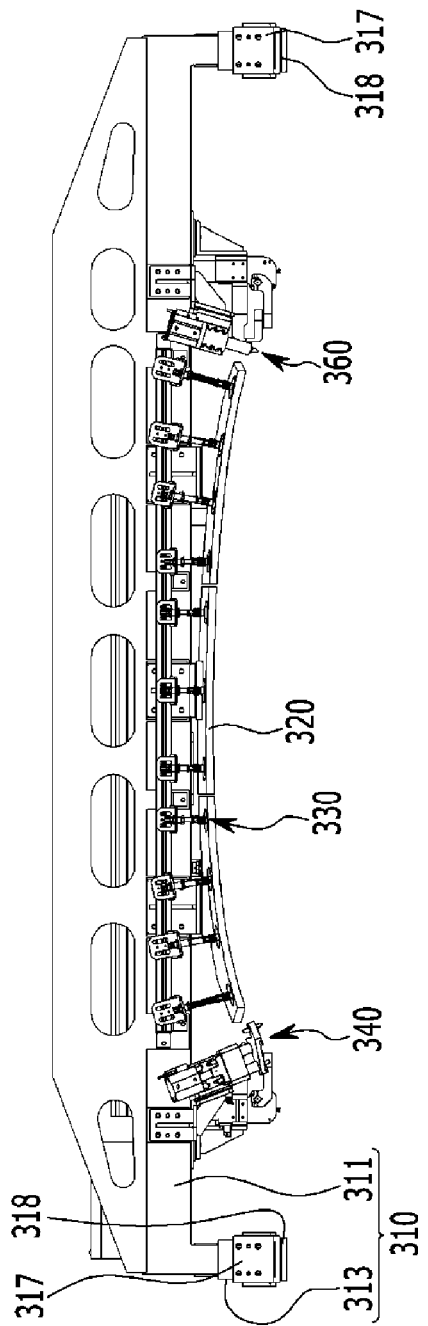

In FIGS. 7 to 9, a roof-pressing jig 300 includes a jig frame 310, a holding pad 320, vacuum cups 330, a restriction pin 340, and a reference pin 360.

The jig frame 310 is detachably installed at an arm end of the handling robot 301. The jig frame 310 includes a main frame 311 and a sub-frame 313 integrally connected to a front end and a rear end of the main frame 311.

The main frame 311 is formed in a shape of a ladder, and includes a robot coupling part 315 combined with the arm end of the handling robot 301. The sub-frame 313 is formed in a linear shape, and is disposed at the front and rear ends of the main frame 311 along a left/right direction (width direction of the body).

Docking brackets 317 docked to the support bracket 233 of the aforementioned side panel home-positioning jig 200 are fixedly installed at opposite sides of each of the front and rear jig frames 310, that is, at opposite sides of each sub-frame 313. A rubber pad 318 is installed at the bottom surface of the docking bracket 317. When the docking bracket 317 is docked to the support bracket 233, the rubber pad 318 serves to buffer impact of the docking bracket 317 with the support bracket 233.

Figure 10:
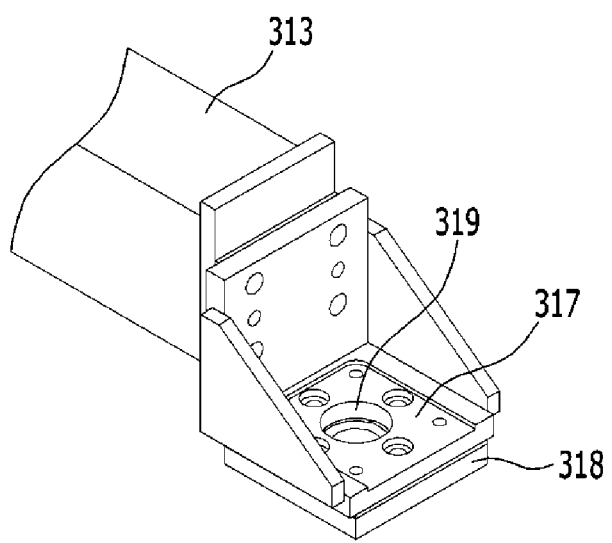
FIG. 10 illustrates a perspective view of a docking bracket of a roof-pressing jig for use with a roof laser-brazing system.
Figure 10:
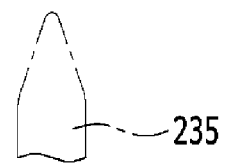

As shown in FIG. 10, a pin hole 319, into which the fixing pin 235 of the side panel home-positioning jig 200 is configured to be inserted, is formed in the docking bracket 317. For example, when the docking bracket 317 is docked to the support bracket 233 of the side panel home-positioning jig 200, the fixing pin 235 is inserted into the pin hole 319 of the docking bracket 317.

The "docking" may be defined as a state in which the docking bracket 317 is positioned at the support bracket 233 when the roof-pressing jig 300 home-positions and presses the roof panel 5.

The holding pad 320 supports the roof panel 5 loaded on the opposite side panels 3 of the body 1, and the opposite side edges of the roof panel 5, along the length direction of opposite side panels 3.

The holding pad 320 is fixedly installed at each of the left and right sides of the main frame 311 of the jig frame 310, and is disposed along a length direction of the main frame 311. The holding pad 320 is formed in a shape corresponding to the roof panel 5.

The holding pad 320 is made of an aluminum material with excellent thermal conductivity so that the opposite side panels 3 and the roof panel 5 may not be overheated when they are bonded by laser-brazing.

The vacuum cups 330 are configured to vacuum-adhere to a skin surface of the opposite side edges of the roof panel 5, and are installed at the main frame 311 of the jig frame 310 corresponding to the holding pad 320.

Figure 11:
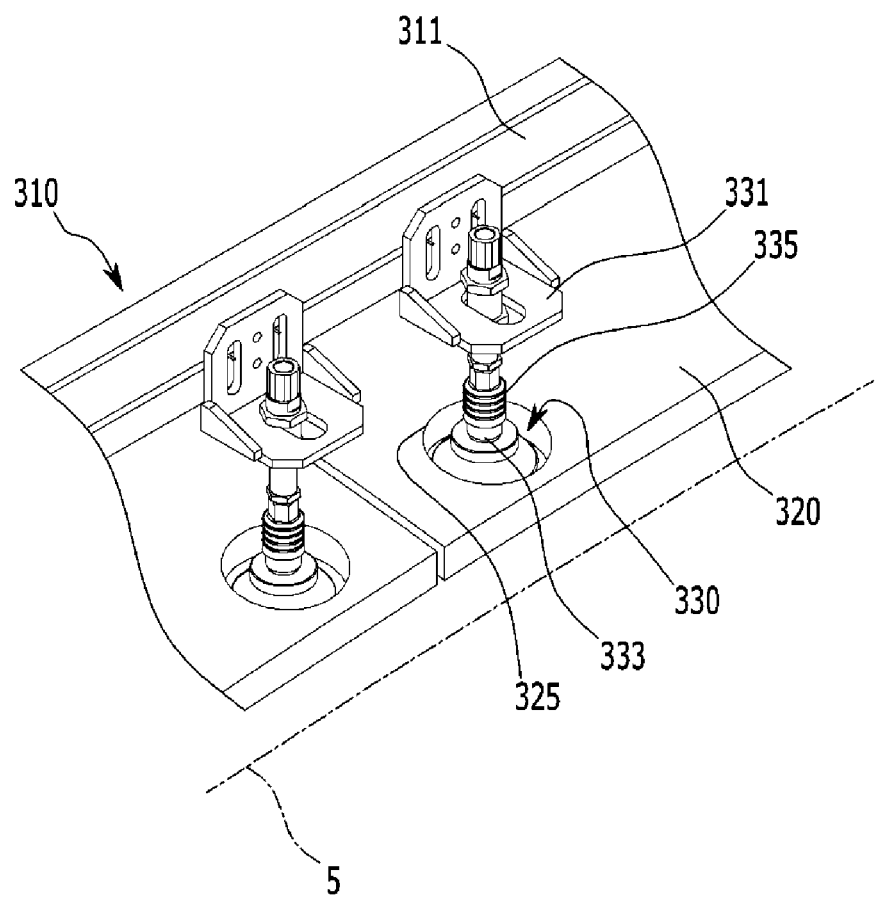
FIG. 11 illustrates a perspective view of a vacuum cup of a roof-pressing jig for use with a roof laser-brazing system.

As shown in FIG. 11, the vacuum cups 330 pass through a plurality of penetration holes 325 that are continuously formed in the holding pad 320 along the opposite side edges of the roof panel 5, and may vacuum adhere to the skin surface of the opposite side edges of the roof panel 5.

The vacuum cups 330 are spaced apart from each other in the main frame 311 of the jig frame 310 along the length direction of the main frame 311, and are installed through a fixing bracket 331 fixed to the main frame 311.

Here, a mounting rod 333 is fixedly installed at the fixing bracket 331. An upper end of the mounting rod 333 is fixed to the fixing bracket 331, and a lower end of the mounting rod 333 is disposed in a penetration hole 325 of the holding pad 320. The vacuum cup 330 is installed at the lower end of the mounting rod 333. The vacuum cup 330 may be connected to the lower end of the mounting rod 333 through a spring 335.

Figure 12:
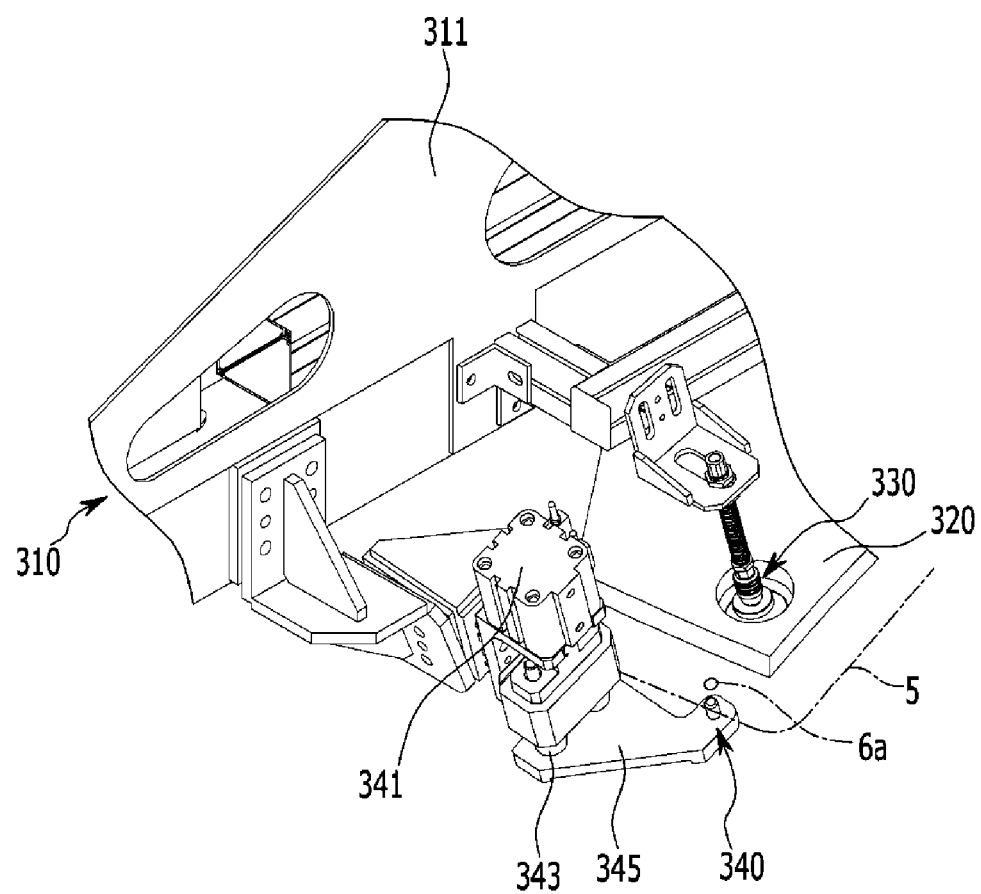
FIG. 12 illustrates a perspective view of a restriction pin of a roof-pressing jig for use with a roof laser-brazing system.

As shown in FIG. 12, when the roof panel 5 is held by the holding pad 320 and the vacuum cups 330, the restriction pin 340 is inserted into a restriction hole 6a formed in the roof panel 5, from an upper side thereof to a lower side thereof, for holding the roof panel 5. The restriction pin 340 is installed to be vertically movable at the main frame 311 of the jig frame 310 in a front end side of the holding pad 320.

A restriction pin cylinder 341 is installed at the jig frame 310 so that the restriction pin 340 may be vertically reciprocally moved. The restriction pin cylinder 341 is connected to the restriction pin 340, and is fixedly installed at the main frame 311 of the jig frame 310.

The restriction pin cylinder 341 includes a restriction pin-operating rod 343 that is moved forward or backward by pneumatic pressure or hydraulic pressure. A restriction bracket 345 for supporting the bottom surface of the roof panel 5 and fixing the restriction pin 340 is installed at the restriction pin-operating rod 343. The restriction bracket 345 includes a flat top surface. The restriction pin 340 is fixedly installed at the top surface of the restriction bracket 345.

Accordingly, in an exemplary form, when the restriction pin-operating rod 343 of the restriction pin cylinder 341 moves upwardly from a state in which it had moved downwardly, the bottom surface of the roof panel 5 may be supported by the restriction bracket 345, and at the same time, the restriction pin 340 may be inserted into the restriction hole 6a of the roof panel 5 to restrict the roof panel 5.

Figure 13:
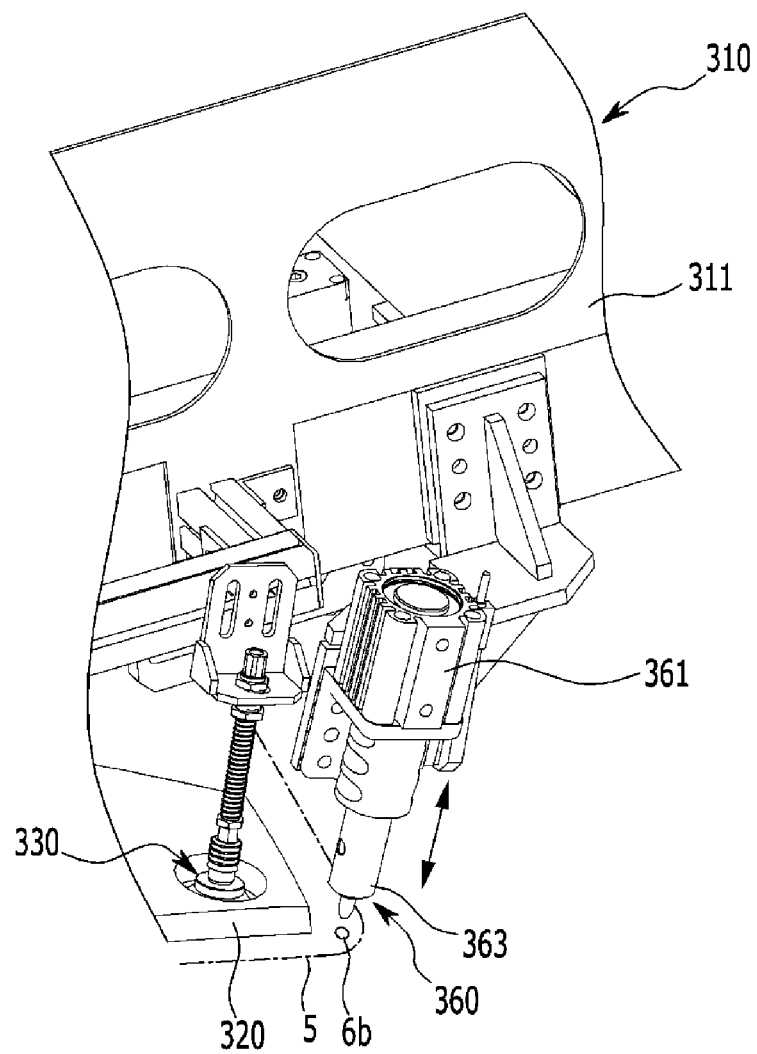
FIG. 13 illustrates a perspective view of a reference pin of a roof-pressing jig for use with a roof laser-brazing system.

As shown in FIG. 13, when the roof panel 5 is held by the holding pad 320, the vacuum cups 330, and the restriction pin 340, the reference pin 360 is inserted into a reference hole 6b formed in the roof panel 5 from a lower side of roof panel 5 to an upper side of roof panel 5. The reference pin 360 is installed to be vertically movable at the main frame 311 of the jig frame 310 in a rear end side of the holding pad 320.

A reference pin cylinder 361 is installed at the jig frame 310 so that the reference pin 360 may be vertically reciprocally moved. The reference pin cylinder 361 is connected to the reference pin 360, and is fixedly installed at the main frame 311 of the jig frame 310.

The reference pin cylinder 361 includes a reference pin-operating rod 363 that is moved forward or backward by pneumatic pressure or hydraulic pressure. The reference pin 360 is installed at the reference pin-operating rod 363.

In an exemplary form, while the roof panel 5 is held by the holding pad 320, the vacuum cups 330, and the restriction pin 340, when the reference pin-operating rod 363 of the reference pin cylinder 361 moves downwardly from a state in which the reference pin-operating rod 363 of the reference pin cylinder 361 had moved upwardly, the reference pin 360 may be inserted into the reference hole 6b of the roof panel 5 to hold a reference position of the roof panel 5.

Figure 14:
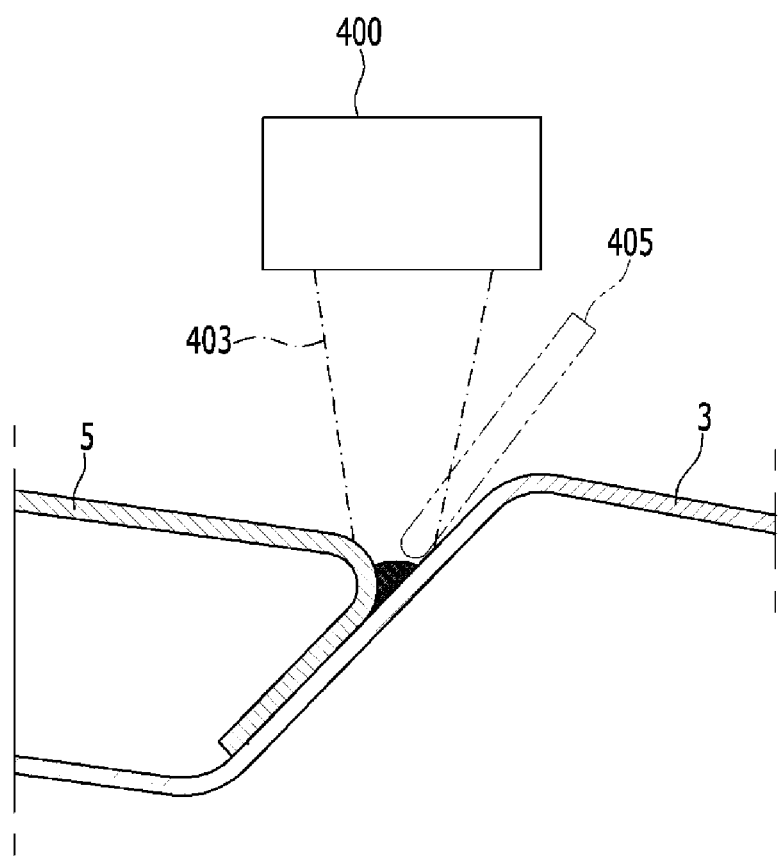
FIG. 14 illustrates a schematic diagram for a laser-brazing principle of a brazing assembly for use with a roof laser-brazing system.

As shown in FIGS. 1 and 14, in an exemplary form of the present disclosure, the brazing assembly 400 brazes the bonding portions between the opposite side panels 3 and the roof panel 5, which are closely pressed to each other by the roof-pressing jig 300, while using a laser as a heating source.

The brazing assembly 400 is installed at each of a pair of brazing robots 401 in the side of brazing section 8 with side panel home-positioning jig 200. A brazing robot 401 is installed at the side of each of the side panel home-positioning jigs 200, with the transfer path of the body 1 therebetween.

Here, the brazing assembly 400 may melt a filler metal by using a laser as a heating source, and may braze the bonding portions between the opposite side panels 3 and the roof panel 5.

For example, the brazing assembly 400 emits continuous wave Nd:YAG laser beams 403 oscillated by a laser oscillator to irradiate the bonding portions between the opposite side panels 3 and the roof panel 5 and to melt a filler wire 405 of the filler metal, thereby brazing the bonding portions between the opposite side panels 3 and the roof panel 5.

Figure 15:
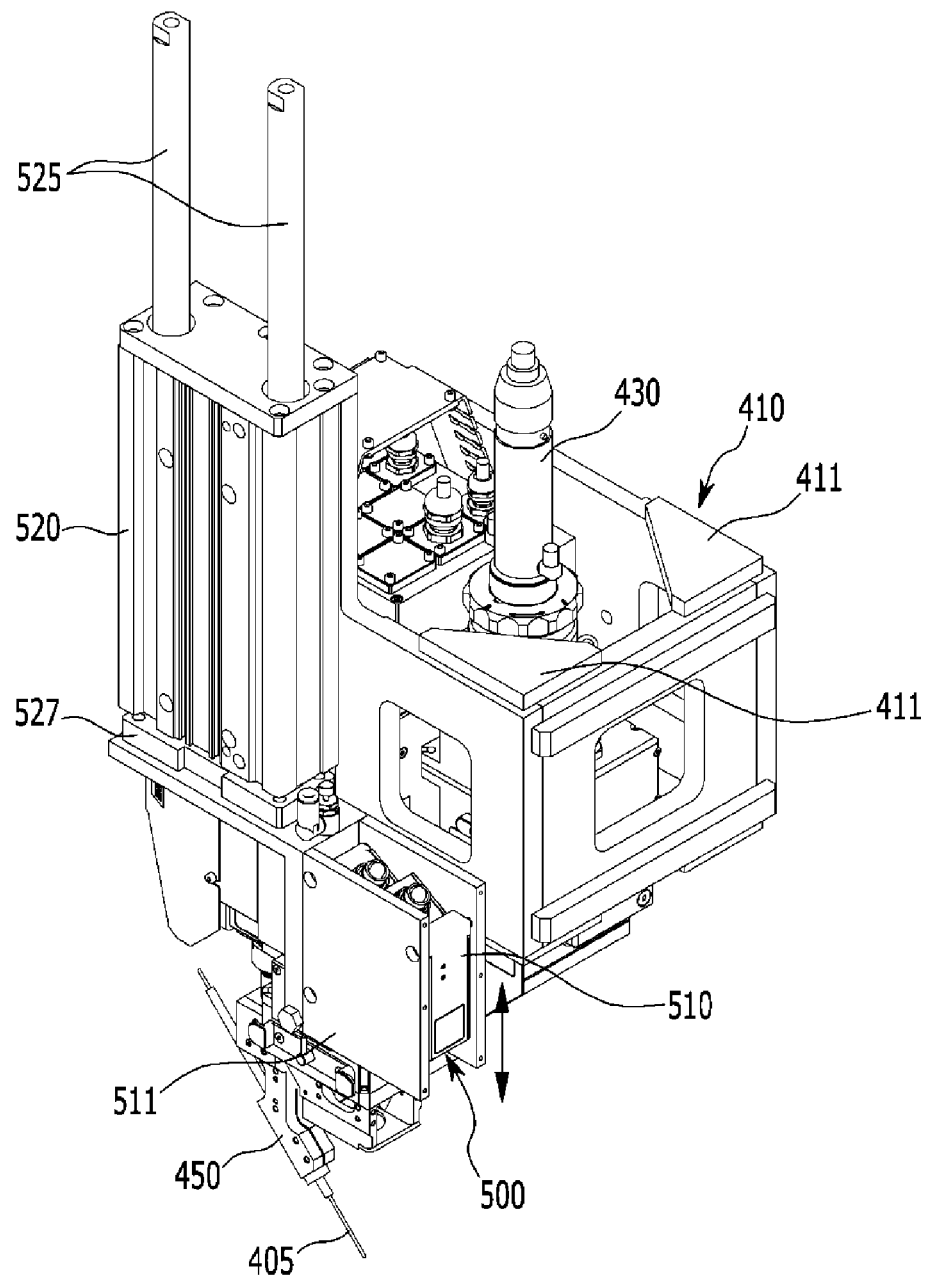
FIGS. 15 to 17 are drawings of illustrating a brazing assembly and a gap measurement unit for use with a roof laser-brazing system.
Figure 16:
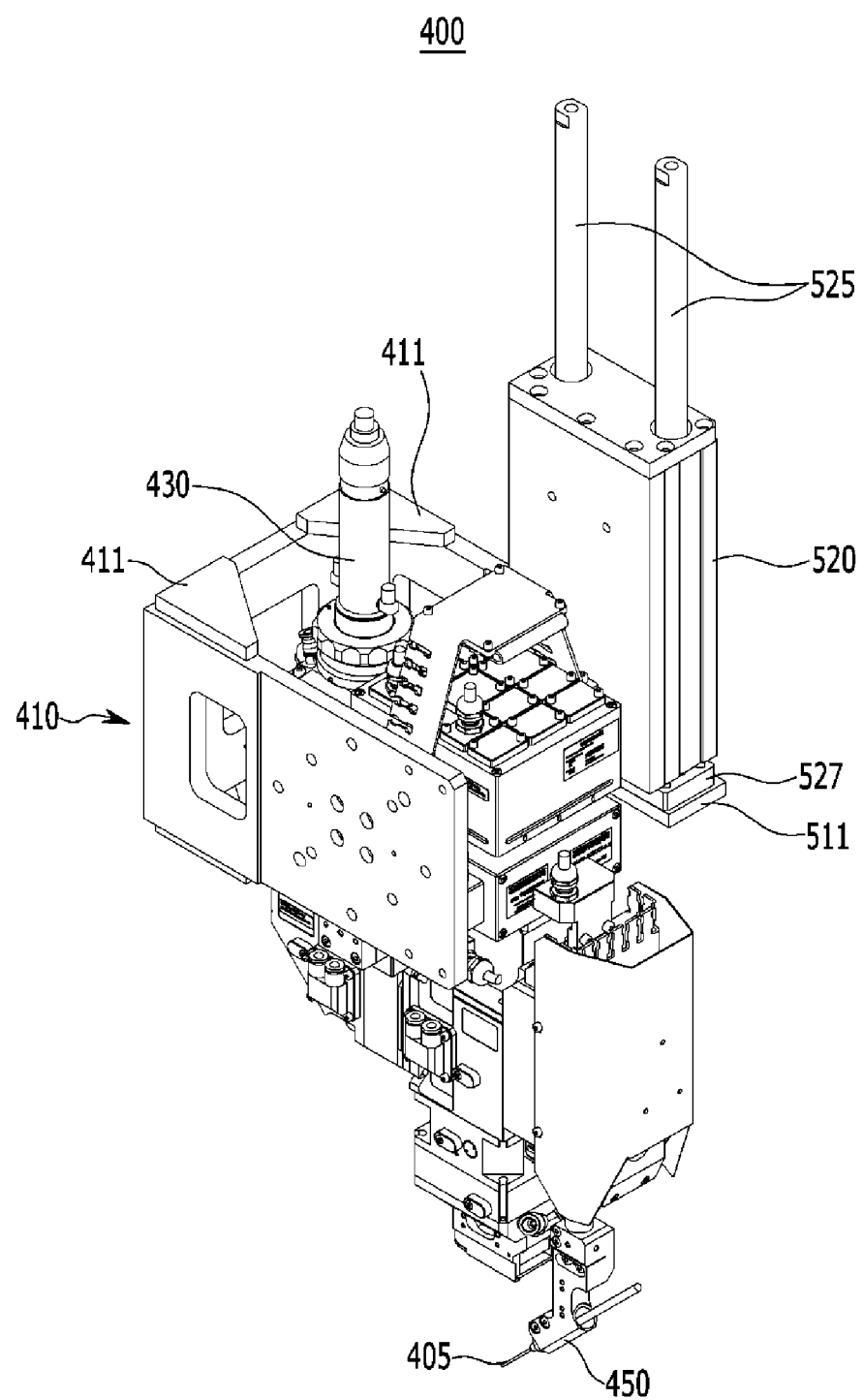
Figure 17:
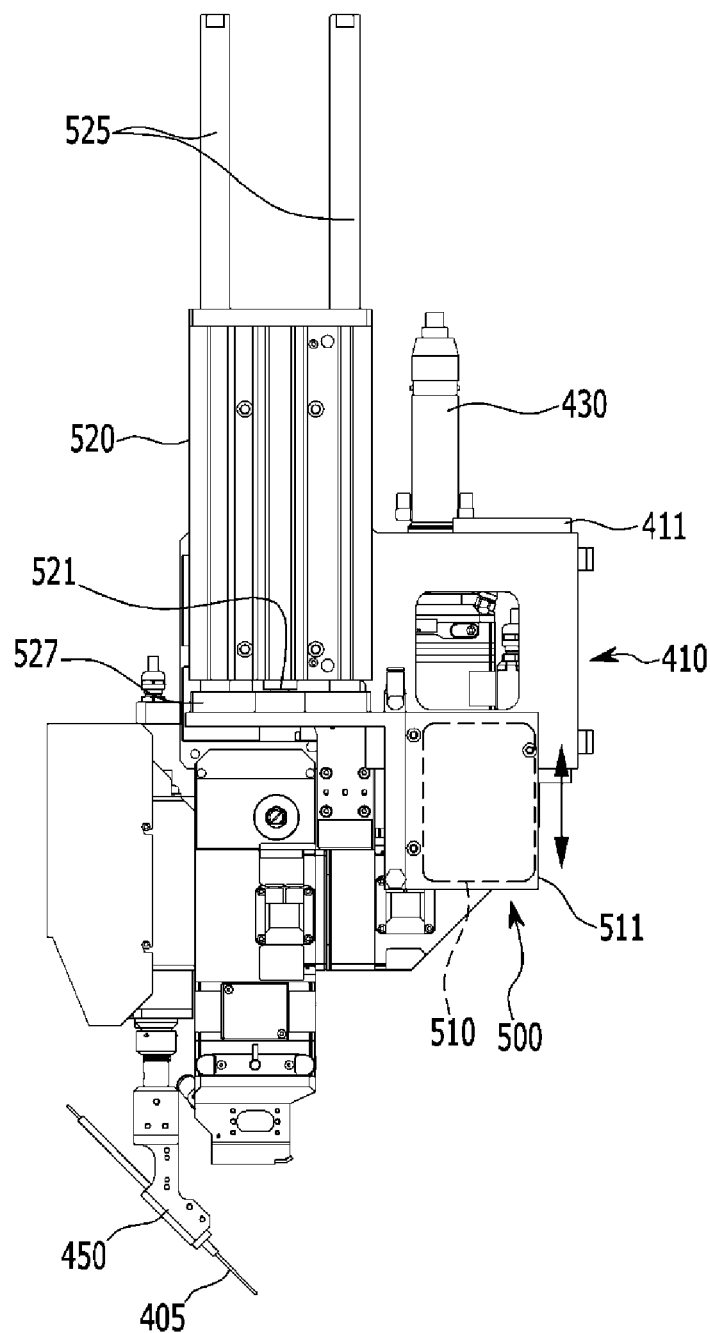

In FIGS. 15 to 17, a brazing assembly 400 includes a brazing bracket 410, a laser head 430, and a wire feeder 450.

The brazing bracket 410 is installed at the front end of the arm of the brazing robot 401. The brazing bracket 410 is configured to be rotatable by the brazing robot 401, and may be transferred along the bonding portions between the opposite side panels 3 and the roof panel 5 by the brazing robot 401.

The brazing bracket 410 is directly mounted on the arm of the brazing robot 401, taking into consideration characteristics of the laser head 430 that are susceptible to an external factor such as vibration. The brazing bracket 410 is substantially formed in a U-shape, and includes reinforcing plates 411 installed at the edges thereof for reducing weakness of the edges thereof.

The laser head 430 is configured to emit laser beams irradiating the bonding portions between the opposite side panels 3 and the roof panel 5, and is installed at the brazing bracket 410. The laser head 430 may be a Nd:YAG optical head configured for emitting continuous wave Nd:YAG laser beams oscillated by a laser oscillator controlled by a controller along the bonding portions between the opposite side panels 3 and the roof panel 5.

Here, the laser oscillated by the laser oscillator irradiates the bonding portions between the opposite side panels 3 and the roof panel 5 from the laser head 430 while being focused by an optical system.

The wire feeder 450 feeds the filler wire 405 of the filler metal to a focus position of the laser beam that is emitted from the laser head 430. The wire feeder 450 is provided in the brazing bracket 410.

Since the laser head 430 and the wire feeder 450 may be configured as a laser optical head device and a wire feeder based on the well-known disclosed technologies in the art, a detailed description thereof will be omitted in the present specification.

In FIG. 1 and FIGS. 15 to 17, a gap measurement unit 500 is configured to measure matching gaps between the roof panel 5 and the opposite side panels 3 that are pressed by the roof-pressing jig 300 before laser-brazing the opposite side panels 3 and the roof panel 5 with the laser head 430 and the wire feeder 450 of the brazing assembly 400.

The gap measurement unit 500 is configured to measure the matching gaps between the roof panel 5 and the opposite side panels 3 pressed by the roof-pressing jig 300 and to output the measured values to a controller (not shown).

Here, the controller may be configured to control operation of the side panel home-positioning jig 200 based on the matching gap values between the roof panel 5 and the opposite side panels 3 measured by the gap measurement unit 500.

For example, the controller is configured to apply a control signal to the second driving part 253 of the side panel home-positioning jig 200 based on the gap values between the roof panel 5 and the opposite side panels 3 measured by the gap measurement unit 500, and to thereby move the clampers 250 of the side panel home-positioning jig 200 holding the opposite side panels 3 in the width direction of the body 1.

In an exemplary form of the present disclosure, based on the gap values between the roof panel 5 and the opposite side panels 3 measured by the gap measurement unit 500, it is possible to smoothly move and home-position the opposite side panels 3 in the width direction of the body 1 with the side panel home-positioning jig 200, and the gaps between the opposite side panels 3 and the roof panel 5 may be set to zero.

The gap measurement unit 500 is installed at the brazing bracket 410 of the brazing assembly 400. The gap measurement unit 500 includes a first profile sensor 510 configured to scan matching portions between the opposite side panels 3 and the roof panel 5 and to measure gaps of the matching portions.

The first profile sensor 510 is configured to scan the matching portions between the opposite side panels 3 and the roof panel 5 with a laser slit, and to measure the gaps of the matching portions. For example, the first profile sensor 510 is configured to set a virtual reference line based on a straight-line portion of the roof panel 5, and to calculate a distance between profiles generated on the virtual reference line, thereby measuring the matching gaps between the roof panel 5 and the opposite side panels 3.

Since the profile sensor may be configured as a profile sensor based on the well-known disclosed technologies, a detailed description thereof will be omitted in the present specification.

Here, the first profile sensor 510 is installed at the brazing bracket 410 on the side of the brazing assembly 400 by a sensor bracket 511. The sensor bracket 511 fixes the first profile sensor 510, and is configured to be able to be moved forward or backward with respect to the brazing bracket 410.

For this purpose, an operating cylinder 520 is fixedly installed at the brazing bracket 410. The operating cylinder 520 includes an operating rod 521 that is configured to be moved forward or backward by a pneumatic pressure or a hydraulic pressure operating rod 521. The sensor bracket 511 to which the first profile sensor 510 is fixed is connected to a front end of the operating rod 521. Accordingly, the sensor bracket 511 may be moved forward or backward by the operating cylinder 520.

In addition, a pair of guide bars 525 for guiding the sensor bracket 511 that is moved forward or backward by the operating rod 521 is installed at the operating cylinder 520. A guide bar 525 is slidably inserted in a body of the operating cylinder 520, and is coupled to a front end of the operating rod 521 through a fixing block 527. The fixing block 527 connects the front end of the operating rod 521 and a front end (lower end in the drawing) of the guide bar 525, and is fixed to the sensor bracket 511.

The sensor bracket 511 may be moved forward by the operating cylinder 520 to measure the matching gaps between the roof panel 5 and the opposite side panels 3 using the first profile sensor 510, before laser-brazing the opposite side panels 3 and the roof panel 5 through the brazing assembly 400.

When the opposite side panels 3 and the roof panel 5 are laser-brazed by the brazing assembly 400, the sensor bracket 511 is moved backward by the operating cylinder 520, thereby preventing interference with the brazing assembly 400.

Figure 18:
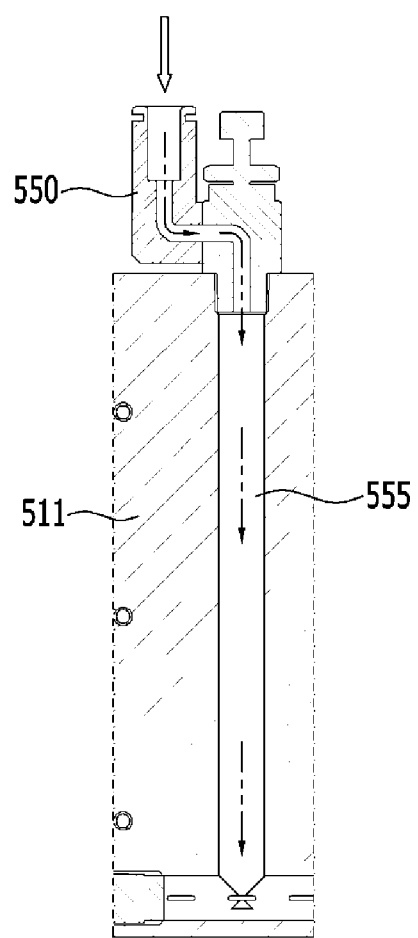
FIG. 18 is a drawing of illustrating an air jet structure for a brazing assembly for use with a roof laser-brazing system.
Figure 19:
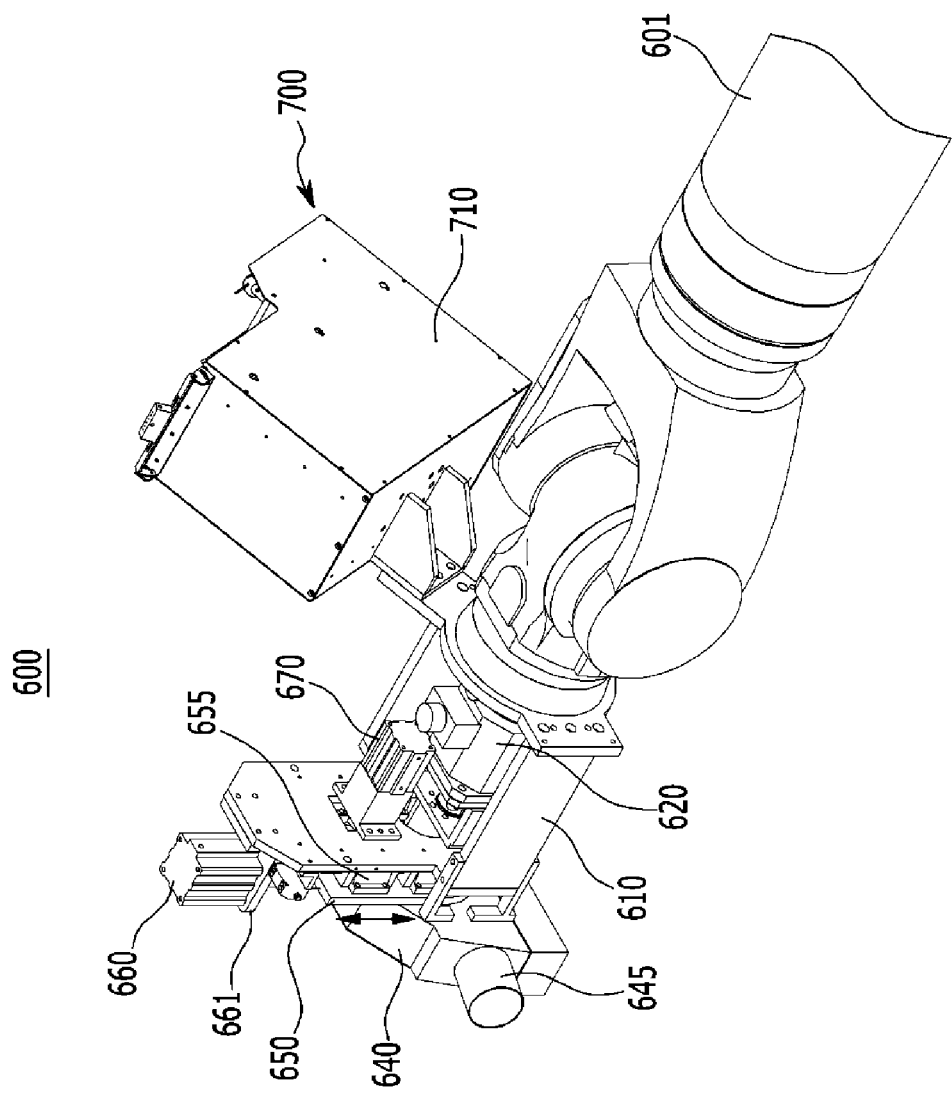
FIGS. 19 and 20 illustrate combined perspective views of a grinding assembly for use with a roof laser-brazing system.
Figure 20:
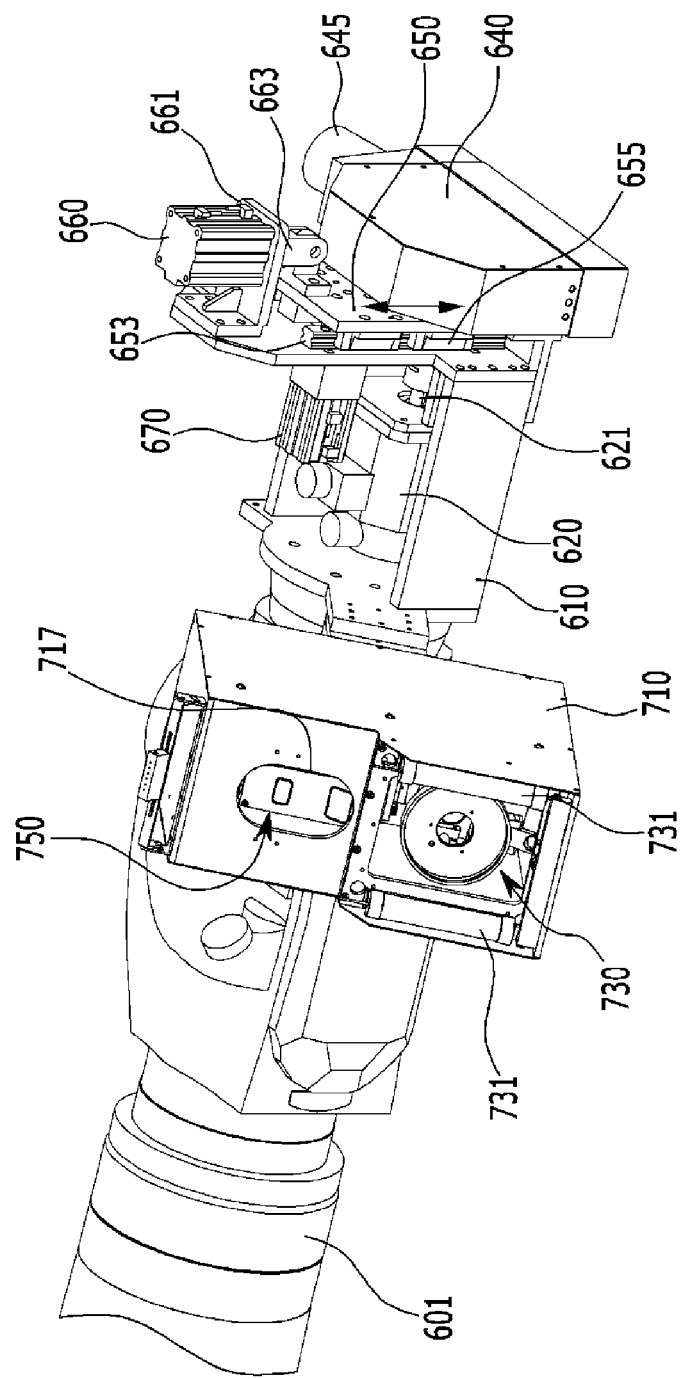
Figure 21:
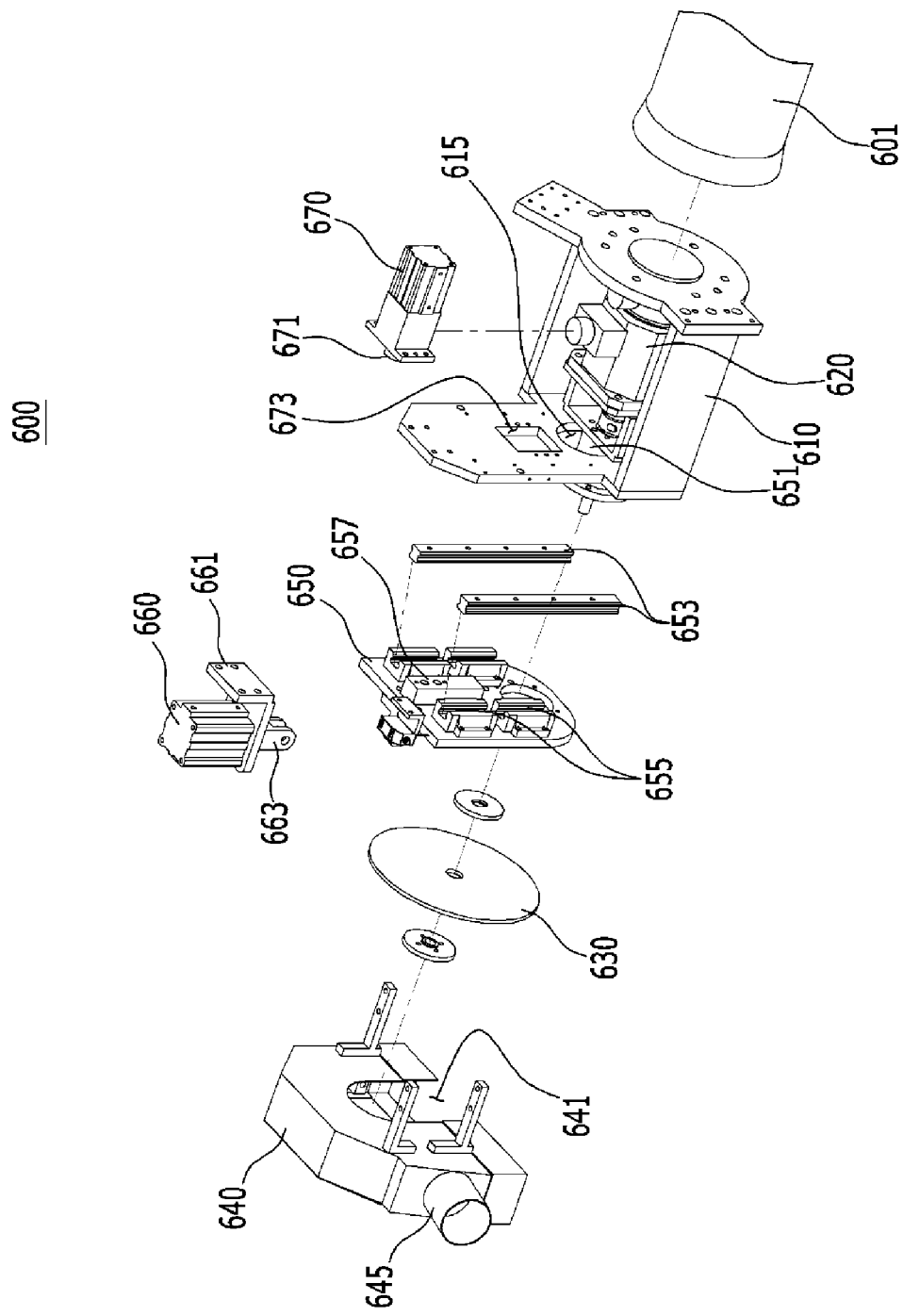
FIG. 21 illustrates an exploded perspective view of a grinding assembly for use with a roof laser-brazing system.
Figure 22:
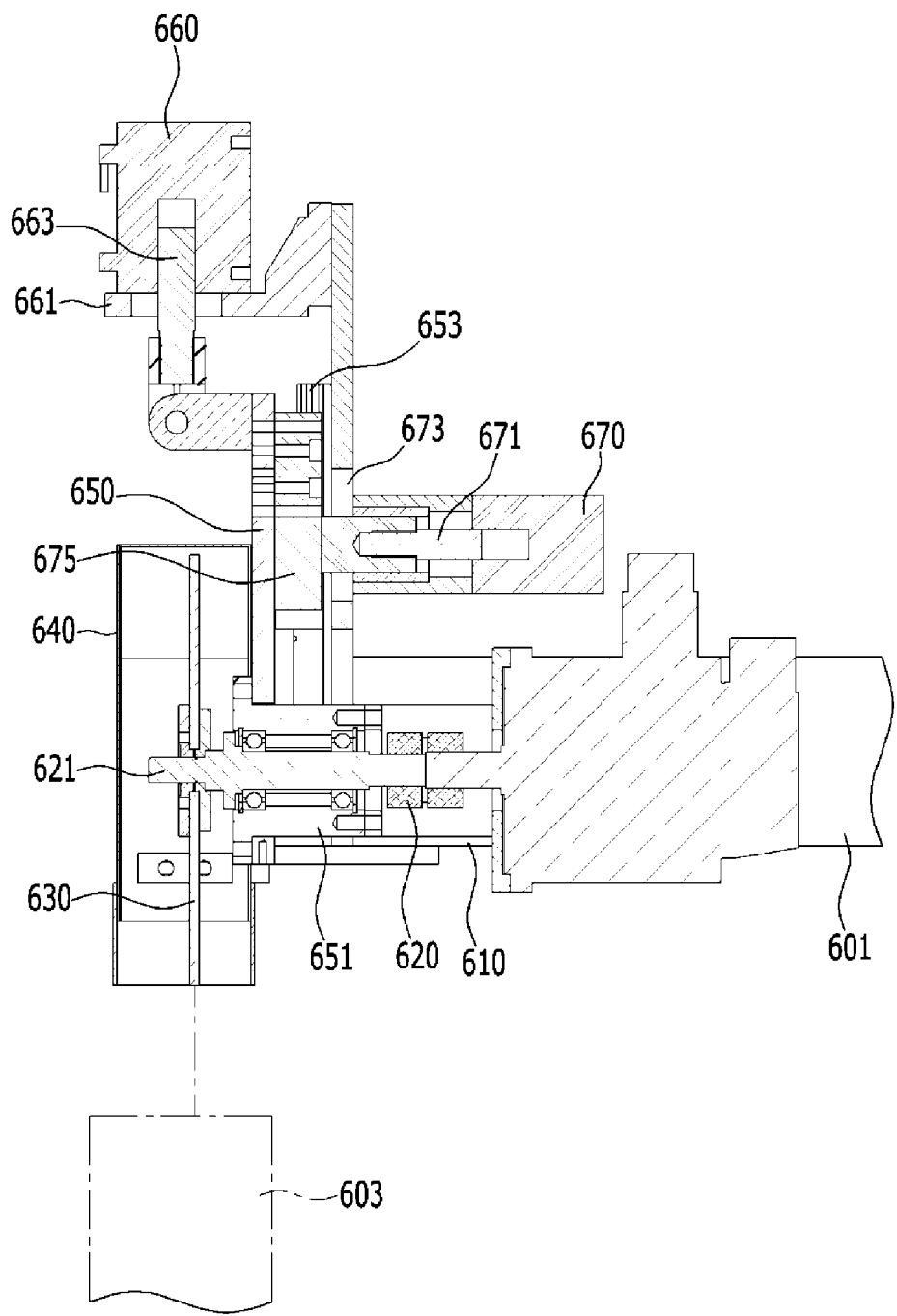
FIG. 22 illustrates an assembled cross-sectional view of a grinding assembly for use with a roof laser-brazing system.

As shown in FIG. 18, an air blower 550 is installed in the sensor bracket 511, and jets air into the brazing portions between the opposite side panels 3 and the roof panel 5 when the opposite side panels 3 and the roof panel 5 are laser-brazed by the brazing assembly 400.

That is, the air blower 550 jets air to the brazing portion sides between the opposite side panels 3 and the roof panel 5 to prevent a foreign material from being attached to the laser-brazing portions between the opposite side panels 3 and the roof panel 5.

The air blower 550 receives air of a predetermined pressure supplied by an air compressor (not shown) to be able to jet the air into the brazing portions between the opposite side panels 3 and the roof panel 5.

For example, the air blower 550 may jet air in a direction perpendicular to the irradiation direction of the laser beam emitted from the laser head 430 of the brazing assembly 400.

For this purpose, an air jet passage 555 connected to the air blower 550 is formed in the sensor bracket 511. The air jet passage 555 is formed along the irradiation direction of the laser beam emitted from the laser head 430, and is provided with a passage opened in the direction perpendicular to the irradiation direction of the laser beam.

In FIG. 1, the grinding assembly 600 is configured to grind brazing-beads (not shown) of the brazing portions between the opposite side panels 3 and the roof panel 5 that are laser-brazed by the brazing assembly 400.

The grinding assembly 600 may be configured to grind the brazing-beads after the opposite side panels 3 and the roof panel 5 have been completely laser-brazed by the brazing assembly 400 in the brazing section 8 of the body transfer path and the body 1 has been transferred into the grinding section 9 along the body transfer path.

Here, the grinding assembly 600 is provided in each of a pair of grinding robots 601 in the grinding section 9 of the body transfer path. The grinding robots 601 are respectively installed at opposite sides of the transfer path of the body 1, with the transfer path of the body 1 therebetween.

In this case, the grinding assembly 600 may be moved along a predetermined taught path by a grinding robot 601, and may grind the brazing-beads of the brazing portions of the opposite side panels 3 and roof panel 5.

In FIG. 1 and FIGS. 19 to 22, a grinding assembly 600 includes a grinding bracket 610, a grinding motor 620, a grinding wheel 630, a wheel cover 640, a moving plate 650, a pressure control cylinder 660, and a stopper cylinder 670.

The grinding bracket 610 is mounted on a front end of an arm of the grinding robot 601 and configured to be rotatable by the grinding robot 601, and may be transferred along the bonding portions between the opposite side panels 3 and the roof panel 5 by the grinding robot 601.

The grinding motor 620 is configured to rotate the grinding wheel 630 (which will be further described later), and is installed to be movable in a vertical direction of the grinding bracket 610 with respect to the drawing.

The grinding wheel 630 is configured to grind the brazing-beads of the laser-brazed opposite side panels 3 and roof panel 5. The grinding wheel 630 is formed in a disc shape, and may be coupled to a drive shaft 621 of the grinding motor 620 to be rotated.

The wheel cover 640, which covers the grinding wheel 630, is configured to collect grinding-dust particles scattered without disturbing vertical movement of the grinding motor 620 when the brazing-beads of the bonding portions of the opposite side panels 3 and roof panel 5 are ground by the grinding wheel 630.

The wheel cover 640 is formed as a housing, a lower portion of which is open, while it otherwise wholly surrounds the grinding wheel 630 coupled to the drive shaft 621 of the grinding motor 620, and is fixedly mounted on the grinding bracket 610.

Here, the grinding wheel 630 is rotated by the grinding motor 620 inside the wheel cover 640, and may grind the brazing-beads through the lower open portion of the wheel cover 640.

A first guide groove 641 formed in the wheel cover 640 is configured for guiding the vertical movement of the grinding motor 620 to not disturb the vertical movement of the grinding motor 620. The first guide groove 641 is formed in one surface of the wheel cover 640 fixed to the grinding bracket 610, from the lower open portion of the wheel cover 640 and in the upper direction.

An inlet 645 is installed at the wheel cover 640 and is configured for sucking the grinding-dust particles scattered when the brazing-beads of the bonding portions of the opposite side panels 3 and roof panel 5 are ground by the grinding wheel 630.

The inlet 645 sucks the grinding-dust particles scattered inside the wheel cover 640 and expels them outside the wheel cover 640, and for example, it may be connected to a vacuum pump (not shown) through a dust particle exhaust line (not shown).

The moving plate 650, which supports the grinding motor 620 with respect to the grinding bracket 610, and guides the vertical movement of the grinding motor 620, is installed between the grinding bracket 610 and the wheel cover 640.

The moving plate 650 is connected to the drive shaft 621 of the grinding motor 620 through a bushing 651, and is installed to be movable in the vertical direction of the grinding bracket 610.

The bushing 651, which is installed at the drive shaft 621 of the grinding motor 620 and rotatably supports the drive shaft 621, is provided as a rotational supporter of a cylindrical shape.

For the vertical movement of the moving plate 650 as described above, a pair of rail blocks 653 are installed at one surface of the grinding bracket 610 corresponding to the moving plate 650. In addition, a pair of sliding blocks 655 that are slidably coupled to the rail blocks 653 are installed at one surface of the moving plate 650 corresponding to the rail blocks 653.

Because the grinding motor 620 is connected to the moving plate 650 through the bushing 651 on the drive shaft 621, grinding motor 620 may move in the vertical direction with respect to the grinding bracket 610 through the rail blocks 653 and the sliding blocks 655.

For example, the grinding motor 620 may be downwardly moved by its own weight and be upwardly moved by a predetermined external force, and lowermost and uppermost movement positions of the grinding motor 620 may be determined by a separate stopper, for example, by a stopper protrusion provided at the upper and lower side of the rail blocks 653.

A second guide groove 615 is formed in the grinding bracket 610 and is configured for vertically guiding the bushing 651 to not disturb the vertical movement of the grinding motor 620.

The second guide groove 615 extends upwardly from a lower side of one surface of the grinding bracket 610 corresponding to the moving plate 650, to be able to vertically guide the bushing 651 on the drive shaft 621 of the grinding motor 620.

The pressure control cylinder 660 is configured to control a grind-pressing force of the grinding wheel 630 with respect to the brazing-beads of the brazing portions of the opposite side panels 3 and the roof panel 5.

The pressure control cylinder 660 is fixedly installed at the grinding bracket 610, and is connected to the moving plate 650. The pressure control cylinder 660 is mounted on an upper end of the grinding bracket 610 through a mounting bracket 661, and may be connected to the moving plate 650 through a pressure control rod 663.

The pressure control cylinder 660, which is a proportional pressure controller configured to control pressure at a pressure of about 0 bar to 10 bar, may control the grind-pressing force of the grinding wheel 630 with respect to the brazing bead by applying a predetermined pneumatic pressure to the pressure control rod 663 depending on a voltage and a current.

The stopper cylinder 670 is configured to selectively limit the vertical movement of the moving plate 650, and is fixedly installed at the grinding bracket 610. That is, the stopper cylinder 670 limits the vertical movement of the grinding motor 620 from its own weight and the external force that are described above.

The stopper cylinder 670 includes a stopper-operating rod 671 that passes through the grinding bracket 610 to move forward or backward with respect to the moving plate 650. Accordingly, a penetration hole 673 is formed in the grinding bracket 610, and through which the stopper-operating rod 671 passes in a portion at which the stopper cylinder 670 is installed.

A friction pad 675 is installed at one surface of the moving plate 650 corresponding to a front end of the stopper-operating rod 671. The friction pad 675 closely contacts the front end of the stopper-operating rod 671, thereby limiting the vertical movement of the grinding motor 620 from its own weight and the external force. For example, the friction pad 675 may be made of a rubber material such as Teflon.

Movement of the grinding motor 620 from its own weight and the external force may be limited by the stopper cylinder 670 to reduce abrasion of the grinding wheel 630 when the brazing-beads are ground by the grinding wheel 630.

Because the grinding assembly 600 is moved along a predetermined taught path by the grinding robot 601, and the brazing-beads are ground by the grinding wheel 630, a grinding surface of the grinding wheel 630 should always grind the brazing-beads at a predetermined position.

However, when the grinding wheel 630 is newly installed at the grinding motor 620, the grinding surface of the grinding wheel 630 is positioned at a lower position than that of the brazing bead.

In an exemplary form of the present disclosure, the moving plate 650, together with the grinding wheel 630, moves the grinding motor 620 upwardly and positions the grinding surface of the grinding wheel 630 at the predetermined position by exerting an external force on the grinding wheel 630 through a separate supporter 603. The movement of the grinding motor 620 is limited by the stopper cylinder 670, and the grinding motor 620 may be fixed to a predetermined position of the grinding surface of the grinding wheel 630.

In contrast, when abrasion of the grinding wheel 630 occurs as the brazing-beads are ground by the grinding wheel 630, the grinding surface of the grinding wheel 630 is positioned at a higher position than that of the brazing bead.

In this case, when the movement limit of the grinding motor 620 is released by the stopper cylinder 670, the grinding motor 620 is downwardly moved by its own weight, together with the grinding wheel 630, and the grinding surface of the grinding wheel 630 is positioned at a predetermined position by the supporter 603. The movement of the grinding motor 620 is limited by the stopper cylinder 670, and may be fixed to the predetermined position of the grinding surface of the grinding wheel 630.

The stopper cylinder 670 may be operated through a sensor (not shown) configured to sense the grinding surface based on the predetermined position of the grinding surface with respect to the grinding wheel 630.

In FIG. 1 and FIGS. 19 to 22, a bead inspection unit 700 is provided to inspect the brazing-beads ground by the grinding assembly 600 in an exemplary form of the present disclosure. That is, the bead inspection unit 700 is configured to automatically inspect for defects of the brazing-beads ground by the grinding assembly 600.

The bead inspection unit 700 is installed at the grinding assembly 600, and may be transferred along the ground brazing-beads of the brazing portions of the opposite side panels 3 and the roof panel 5 by the grinding robot 601.

Figure 23:
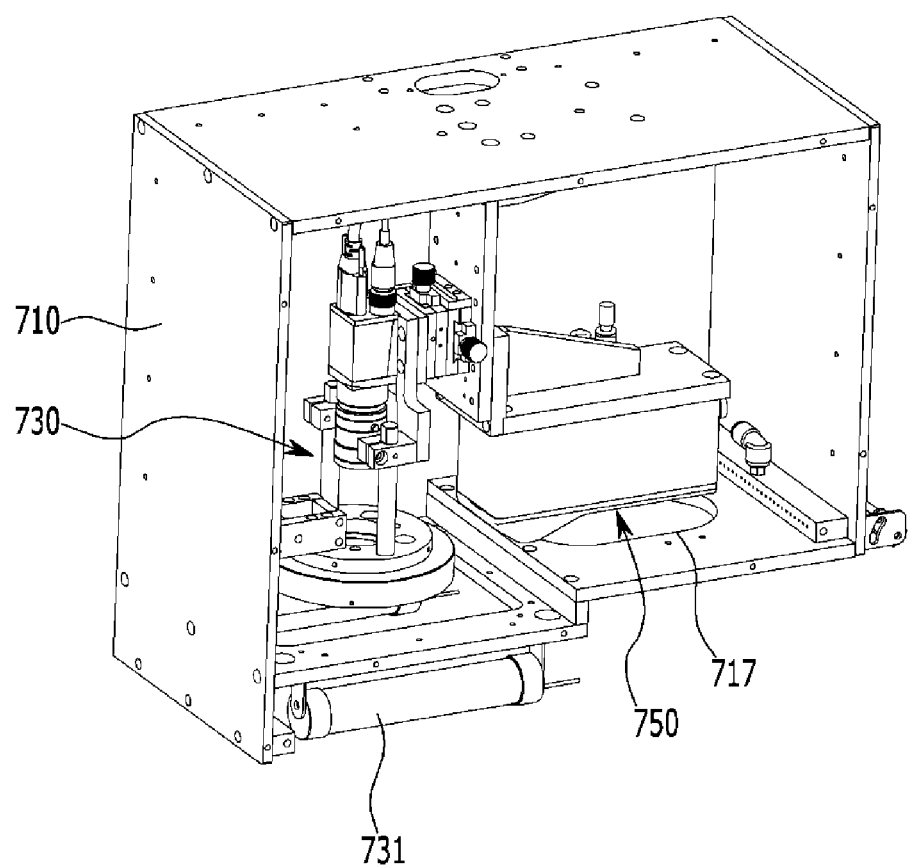
FIG. 23 illustrates a schematic diagram of a bead inspection unit for use with a roof laser-brazing system.

As shown in FIG. 23, the bead inspection unit 700 includes a mounting bracket 710, a vision camera 730, and a second profile sensor 750.

The mounting bracket 710 is fixedly installed at the grinding bracket 610 of the grinding assembly 600. The mounting bracket 710 may rotate together with the grinding bracket 610 by the grinding robot 601.

The vision camera 730, which is configured to vision-photograph the ground brazing-beads and output the vision-photographed data to the aforementioned controller, is fixedly installed to the mounting bracket 710.

A lighting unit 731, configured to emit light irradiating the ground brazing-beads, is installed at the mounting bracket 710. The lighting unit 731 is fixedly installed at the mounting bracket 710 in a vision-photographing area of the vision camera 730.

The controller may be configured to calculate a width, etc. of the ground brazing bead by analyzing the vision data transmitted from the vision camera 730, and may be configured to detect a defect of the ground brazing bead by comparing the calculated value with a reference value of the ground brazing bead.

The vision camera 730 is configured to vision-photograph a predetermined reference point of the body 1, such as a front glass-mounting hole and a brazing portion of a center pillar side, before the brazing-beads are ground by the grinding assembly 600, and may output the vision-photographed data to the controller. That is, the vision camera 730 may be configured to detect a position of the body 1 before the brazing-beads are ground by the grinding assembly 600.

The controller may be configured to calculate a position value of the body 1 by analyzing the vision data transmitted from the vision camera 730, and may be configured to detect the defect of the ground brazing bead by comparing the calculated value with a reference position value of the body.

The second profile sensor 750, which is configured to scan the ground brazing bead to measure a height, etc. of the ground brazing bead, is fixedly installed at the mounting bracket 710 together with the vision camera 730.

The second profile sensor 750 may be configured to scan the ground brazing bead with a laser slit, and may be configured to measure the height, etc. of the brazing bead. For example, the second profile sensor 750 is configured to detect a cross-section of the ground brazing bead as a 2-dimensional profile shape, and to output the detected signal to the controller.

The controller may be configured to calculate a height, etc. of the ground brazing bead by analyzing the detected signal transmitted from the second profile sensor 750, and may be configured to detect the defect of the ground brazing bead by comparing the calculated value with a reference value of the ground brazing bead.

Since the profile sensor may be configured as a profile sensor based on the well-known disclosed technologies in the art, a detailed description thereof will be omitted in the present specification.

Here, a beam-through hole 717, configured to pass a scan beam (laser slit) emitted from the second profile sensor 750 therethrough, is formed in the mounting bracket 710.

Operation of the roof laser-brazing system according to an exemplary form of the present disclosure will now be described in detail with reference to aforementioned drawings.

First, in an exemplary form of the present disclosure, the body 1, the opposite side panels 3 of which are assembled to the predetermined structure, is transferred to the side panel home-positioning jig 200 of the brazing section 8 along the transfer line 7 by the carriage (not shown) in the main buck process of the vehicle body assembly line.

The moving frame 220 of the side panel home-positioning jig 200 has been moved away from the opposite side panels 3 of the body 1 along the width direction of the body 1 by the first driving part 225.

The clampers 250 installed at the support frame 240 by the post frame 230 on the moving frame 220 have been moved away from the opposite side panels 3 of the body 1 by the moving frame 220.

In an exemplary form of the present disclosure, the support frame 240 is rotated by the drive motor 214, and the clampers 250 corresponding to the body 1 of the kind of vehicle are positioned at the opposite side panels 3 of the body 1.

In the above-described state, when the body 1 is positioned in the side of the brazing section 8 with side panel home-positioning jig 200, the moving frame 220 is moved to the opposite side panels 3 of the body 1 by the first driving part 225, and the clampers 250 are moved to a predetermined position corresponding to the body 1 of the kind of vehicle.

Next, the clampers 250 themselves are moved forward to the opposite side panels 3 of the body 1 by the second driving part 253 along the width direction of the body 1, and then the upper portions of the opposite side panels 3 are clamped by the clampers 250.

Next, while the opposite side panels 3 of the body 1 are held by the clampers 250, the roof panel 5 aligned in the roof alignment jig 101 is unloaded from the roof alignment jig 101 through the roof loading jig 103, and then the roof panel 5 is loaded on the opposite side panels 3 of the body 1.

Here, the roof loading jig 103 unloads and loads the roof panel 5 while the roof loading jig 103 is mounted on the handling robot 301. While the roof panel 5 is loaded on the opposite side panels 3 of the body 1 by the roof loading jig 103, the roof loading jig 103 is separated from the handling robot 301, and then the spot welding gun is mounted on the handling robot 301.

Next, the roof panel 5 and the front/rear roof rails are spot-welded by each of one spot by the spot welding gun of the handling robot 301 and the spot welding gun of the welding robot 105. Next, the spot welding gun is separated from the handling robot 301, and then the roof-pressing jig 300 is mounted on the handling robot 301.

Next, the roof-pressing jig 300 is moved to the roof panel 5 by the handling robot 301, and then the roof panel 5 is home-positioned and pressed by the roof-pressing jig 300.

The operation of the roof-pressing jig 300 will now be described in more detail. The jig frame 310 of the roof-pressing jig 300 is moved to the roof panel 5 by the handling robot 301.

When the jig frame 310 is pressed with respect to the roof panel 5 by the handling robot 301, the opposite side edges of the roof panel 5 are supported by the holding pad 320 while the skin surfaces of the opposite side edges are vacuum-adhered by the vacuum cups 330.

The restriction pin-operating rod 343 of the restriction pin cylinder 341 moves downwardly, and then the restriction pin-operating rod 343 moves upwardly.

Then, the restriction bracket 345 at which the restriction pin 340 is installed supports the bottom surface of the roof panel 5 through the restriction pin-operating rod 343, and the restriction pin 340 is upwardly inserted into the restriction hole 6a of the roof panel 5, thereby holding the roof panel 5.

At the same time, the reference pin-operating rod 363 of the reference pin cylinder 361 moves upwardly, and then the reference pin-operating rod 363 moves downwardly.

Then, the reference pin 360 is downwardly inserted into the reference hole 6b of the roof panel 5 by the reference pin-operating rod 363 to maintain the reference position of the roof panel 5.

In the process in which the roof panel 5 is home-positioned and pressed by the roof-pressing jig 300, the docking bracket 317 of the jig frame 310 may be docked to the support bracket 233 of the side panel home-positioning jig 200.

When the docking bracket 317 is docked to the support bracket 233, the fixing pin 235 of the support bracket 233 is coupled to the pin hole 319 of the docking bracket 317. The pin clamper 237 on the support bracket 233 is rotated due to operation of the pin clamping cylinder 238, and clamps the fixing pin 235 together with the docking bracket 317 through an operating pressure of the pin clamping cylinder 238.

Accordingly, in an exemplary form of the present disclosure, the roof panel 5 loaded on the opposite side panels 3 of the body 1 may be home-positioned and pressed by the roof-pressing jig 300.

The docking bracket 317 of the roof-pressing jig 300 may be docked to the support bracket 233 of the side panel home-positioning jig 200, and the docking bracket 317 may be stably fixed to the support bracket 233 by the fixing pin 235 and the pin clamper 237.

When the roof panel 5 is pressed by the roof-pressing jig 300, the brazing assembly 400 is moved to the matching portions between the opposite side panels 3 and the roof panel 5 by the brazing robot 401.

Then, the sensor bracket 511 of the gap measurement unit 500 is moved forward to the matching portions between the opposite side panels 3 and the roof panel 5 by the operating cylinder 520.

The first profile sensor 510 fixed to the sensor bracket 511 is close to the matching portions between the opposite side panels 3 and the roof panel 5, and the brazing robot 401 moves the first profile sensor 510 along the matching portions between the opposite side panels 3 and the roof panel 5.

The first profile sensor 510 scans the matching portions between the opposite side panels 3 and the roof panel 5 with the laser slit to measure the gaps of the matching portions. The first profile sensor 510 sets the virtual reference line based on a straight-line portion of the roof panel 5, and calculates the distance between profiles generated on the virtual reference line, thereby measuring the matching gaps between the roof panel 5 and the opposite side panels 3.

The first profile sensor 510 transmits the matching gap values between the roof panel 5 and the opposite side panels 3 to the controller, and the controller applies the control signal to the second driving part 253 of the side panel home-positioning jig 200 based on the measured gap values between the roof panel 5 and the opposite side panels 3.

Then, the clampers 250 of the side panel home-positioning jig 200 holding the opposite side panels 3 of the body 1 are moved in the width direction of the body 1 by the second driving part 253, and the opposite side panels 3 are smoothly moved and home-positioned in the width direction of the body 1.

The matching portions between the opposite side panels 3 and the roof panel 5 are laser-brazed by the brazing assembly 400, and the gaps of the matching portions may be measured by the gap measurement unit 500.

The matching gaps between the roof panel 5 and the opposite side panels 3 may be set to zero by adjusting the positions of the opposite side panels 3 using the side panel home-positioning jig 200 and based on the gap values between the roof panel 5 and the opposite side panels 3.

In the state of zeroing the matching gaps between the roof panel 5 and the opposite side panels 3 by adjusting the positions of the opposite side panels 3, the sensor bracket 511 of the gap measurement unit 500 is moved backward by the operating cylinder 520.

Then, the brazing assembly 400 is moved along the bonding portions between the opposite side panels 3 and the roof panel 5 (matching portions) by the brazing robot 401, and the bonding portions between the opposite side panels 3 and the roof panel 5 are laser-brazed by the brazing assembly 400.

While avoiding interference with the sensor bracket 511 by the operating cylinder 520, the brazing assembly 400 emits the laser beam to irradiate the bonding portions between the opposite side panels 3 and the roof panel 5 through the laser head 430, and supplies the filler wire 405 to the focus position of the laser beam through the wire feeder 450.

The brazing assembly 400 melts the filler wire 405 using the laser beam as the heat source, and the bonding portions between the opposite side panels 3 and the roof panel 5 may be integrally brazed through the melted filler wire 405.

As described above, when the bonding portions between the opposite side panels 3 and the roof panel 5 are brazed by the brazing assembly 400, air is supplied in the air jet passage 555 of the sensor bracket 511 by the air blower 550.

It is possible to prevent a foreign material from being attached to the laser-brazing portions between the opposite side panels 3 and the roof panel 5 by injecting the air supplied by the air blower 550 through the air jet passage 555 in a direction perpendicular to the irradiation direction of the laser beam.

When the bonding portions between the opposite side panels 3 and the roof panel 5 are brazed by the brazing assembly 400, the brazing-beads are generated at the bonding portions.

When the bonding portions between the opposite side panels 3 of the body 1 and the roof panel 5 are completely laser-brazed, the side panel home-positioning jig 200 and the roof-pressing jig 300 are positioned at the home position.

Next, the roof-pressing jig 300 is separated from the handling robot 301, and then the spot welding gun is mounted on the handling robot 301. Then, the roof panel 5 and the front/rear roof rails are spot-welded by the spot welding gun of the handling robot 301 and the spot welding gun of the welding robot 105.

Next, after the body 1 is transferred along the transfer line 7 to the grinding section 9, the grinding assembly 600 is moved to the brazing bead of the bonding portions between the opposite side panels 3 and roof panel 5 by the grinding robot 601 in the grinding section 9.

The grinding wheel 630 of the grinding assembly 600 may be newly mounted on the grinding motor 620 before the grinding assembly 600 is moved to the brazing bead of the bonding portions between the opposite side panels 3 and the roof panel 5.

In this case, since the grinding assembly 600 is moved by the grinding robot 601 along a predetermined taught path, and the brazing bead is ground by the grinding wheel 630, the grinding surface of the grinding wheel 630 is positioned below the reference position thereof based on the position of the brazing bead.

Accordingly, the stopper-operating rod 671 of the stopper cylinder 670 is moved backward to release the movement restriction of the grinding motor 620. Then, the grinding motor 620 is downwardly moved, by the moving plate 650, together with the grinding wheel 630, by its own weight.

The grinding motor 620 is moved upwardly, together with the grinding wheel 630, by the moving plate 650, by applying the external force to the grinding wheel 630 with the separate supporter 603, and the grinding surface of the grinding wheel 630 is positioned at the reference position.

Next, the stopper-operating rod 671 of the stopper cylinder 670 is moved forward, and the movement of the grinding motor 620 is limited by the friction pad 675 closely contacting the front end of the stopper-operating rod 671.

After the grinding assembly 600 is moved to the brazing bead, the vision camera 730 of the bead inspection unit 700, mounted on the grinding robot 601 together with the grinding assembly 600, senses the position of the body 1.

The vision camera 730 vision-photographs the brazing portions of the front glass mounting hole and the center pillar of the body 1, and outputs the photographed vision data to the controller. The controller analyzes the vision data transmitted from the vision camera 730 to calculate the position value of the body 1, and adjusts the grinding position of the grinding assembly 600 by comparing the calculated position value with the reference value (reference position value of the body).

Next, the grinding wheel 630 is rotated by the grinding motor 620, the grinding wheel 630 is moved along the brazing-beads by the grinding robot 601, and the brazing-beads are ground by the grinding wheel 630.

The grinding-dust particles scattered during grinding of the brazing-beads are collected in the wheel cover 640 surrounding the grinding wheel 630, and the grinding-dust particles are sucked through the inlet 645 of the wheel cover 640 and then expelled outside the wheel cover 640. In an exemplary form of the present disclosure, the grind-pressing force of the grinding wheel 630 applied to the brazing bead may be controlled by the pressure control cylinder 660.

In an exemplary form of the present disclosure, as the brazing-beads are ground by the grinding wheel 630, the grinding wheel 630 is worn away.

In this case, since the grinding assembly 600 is moved by the grinding robot 601 along the predetermined taught path and the brazing bead is ground by the grinding wheel 630, the grinding surface of the grinding wheel 630 is positioned above the reference position thereof based on the position of the brazing bead.

Accordingly, the stopper-operating rod 671 of the stopper cylinder 670 is moved backward to release the movement restriction of the grinding motor 620. Then, the grinding motor 620 is downwardly moved, together with the grinding wheel 630, by its own weight, and the grinding surface of the grinding wheel 630 is positioned at the predetermined position by the supporter 603.

Then, the stopper-operating rod 671 of the stopper cylinder 670 is moved forward, and the movement of the grinding motor 620 is limited by the friction pad 675 closely contacting the front end of the stopper-operating rod 671.

After the brazing bead is ground by the grinding assembly 600, the grinding bracket 610 of the grinding assembly 600 is rotated by the grinding robot 601.

Then, the mounting bracket 710 of the bead inspection unit 700 rotates together with the grinding bracket 610, and the vision camera 730 of the bead inspection unit 700 and the second profile sensor 750 are positioned at the ground brazing-bead side.

Next, the bead inspection unit 700 is moved along the ground brazing-beads by the grinding robot 601, and the ground brazing-beads are photographed by the vision camera 730 and then the photographed vision data is outputted to the controller.

The controller calculates the width of the ground brazing-bead by analyzing the vision data transmitted from the vision camera 730, and detects a defect of the ground brazing-bead by comparing the calculated width with a reference width (reference width of the ground brazing bead).

The second profile sensor 750 detects the cross-section of the ground brazing-bead as a 2-dimentional profile shape, and outputs the detected signal to the controller.

The controller calculates the height of the ground brazing-bead by analyzing the detected signal transmitted from the second profile sensor 750, and detects the defect of the ground brazing-bead by comparing the calculated value with a reference value (reference value of the ground brazing-bead).

If a defect of the ground brazing-bead is detected by the bead inspection unit 700, the detected defect is displayed on a display, and the detected defect is transmitted to a repair process and quality history management server.

As such, when the defect detection of the ground brazing-bead is completed, the grinding robot 601 is positioned at the home position, and the body 1 to which the roof panel 5 is bonded is transferred to a subsequent process through the transfer line 7.

Therefore, the roof laser-brazing system 100 may laser-braze the roof panel 5 to the opposite side panels 3 based on the body 1 using the processes described above.

Therefore, according to an exemplary form of the present disclosure, it is possible to omit the roof molding of the conventional art, by laser-brazing the bonding portions between the opposite side panels 3 of the body 1 and the roof panel 5.

Further, according to an exemplary form of the present disclosure, it is possible to improve appearance of the body of the vehicle, reduce material costs, and reduce labor costs due to mounting of the roof molding, by omitting the roof molding according of the conventional art.

Further, according to an exemplary form of the present disclosure, it is possible to further improve the brazing quality because the roof panel 5 is home-positioned and held to the opposite side panels 3 by the roof-pressing jig 300, the gaps between the opposite side panels 3 and the roof panel 5 are zeroed using the side panel home-positioning jig 200 and the gap measurement unit 500, the opposite side panels 3 and the roof panel 5 are laser-brazed, and the grinding defect of the brazing bead is automatically detected by the bead inspection unit 700.

Further, according to an exemplary form of the present disclosure, since the roof panel 5 may be laser-brazed corresponding to the bodies 1 of various kinds of vehicles, it is possible to flexibly produce various kinds of vehicles, to reduce equipment-preparing time, to achieve a weight reduction and simplification of entire equipment, and to reduce initial investment and additional investment for additional vehicles.

While this disclosure has been described in connection with what is presently considered to be practical exemplary forms, it is to be understood that technical aspects of the present disclosure are not limited to exemplary forms suggested in the specification. A person of ordinary skill in this field of art who understands the technical aspects of the present disclosure can suggest another exemplary form by modifications, changes, removal, and addition of constituent elements within a range of technical aspects that are the same as in the present disclosure, and it will also be within a range of right of the present disclosure.

<Description of symbols>

| | |
|---|---|
| 1 . . . body | 3 . . . side panel |
| 5 . . . roof panel | 6a . . . restriction hole |
| 6b . . . reference hole | 7 . . . transfer line |
| 8 . . . brazing section | 9 . . . grinding section |
| 100 . . . roof laser-brazing system | 101 . . . roof alignment jig |
| 103 . . . roof loading jig | 105 . . . welding robot |
| 200 . . . side panel home-positioning jig | 210 . . . base frame |
| 220 . . . moving frame | 221 . . . guide rail |
| 223 . . . slider | 225 . . . first driving part |
| 227 . . . first servo motor | 229 . . . lead screw |
| 230 . . . post frame | 233 . . . support bracket |
| 235 . . . fixing pin | 237 . . . pin clamper |
| 238 . . . pin clamping cylinder | 240 . . . support frame |
| 241 . . . drive motor | 250 . . . clamper |
| 251 . . . clamp cylinder | 253 . . . second driving part |
| 255 . . . second servo motor | 257 . . . LM guide |
| 258 . . . moving block | 259 . . . rail member |
| 300 . . . roof-pressing jig | 301 . . . handling robot |
| 310 . . . jig frame | 311 . . . main frame |
| 313 . . . sub-frame | 315 . . . robot coupling part |
| 317 . . . docking bracket | 319 . . . pin hole |

<Description of symbols> -continued

| | |
|---|---|
| 320 . . . holding pad | 325, 673 . . . penetration hole |
| 330 . . . vacuum cup | 331 . . . fixing bracket |
| 333 . . . mounting rod | 335 . . . spring |
| 340 . . . restriction pin | 341 . . . restriction pin cylinder |
| 343 . . . restriction pin-operating rod | 345 . . . restriction bracket |
| 360 . . . reference pin | 361 . . . reference pin cylinder |
| 363 . . . reference pin-operating rod | 400 . . . brazing assembly |
| 401 . . . brazing robot | 403 . . . laser beam |
| 405 . . . filler wire | 410 . . . brazing bracket |
| 411 . . . reinforcing plate | 430 . . . laser head |
| 450 . . . wire feeder | 500 . . . gap measurement unit |
| 510 . . . first profile sensor | 511 . . . sensor bracket |
| 520 . . . operating cylinder | 521 . . . operating rod |
| 525 . . . guide bar | 527 . . . fixing block |
| 550 . . . air blower | 555 . . . air jet passage |
| 600 . . . grinding assembly | 601 . . . grinding robot |
| 603 . . . supporter | 610 . . . grinding bracket |
| 615, 641 . . . guide groove | 620 . . . grinding motor |
| 621 . . . drive shaft | 630 . . . grinding wheel |
| 640 . . . wheel cover | 645 . . . inlet |
| 650 . . . moving plate | 651 . . . bushing |
| 653 . . . rail block | 655 . . . sliding block |
| 660 . . . pressure control cylinder | 661 . . . mounting bracket |
| 663 . . . pressure control rod | 670 . . . stopper cylinder |
| 671 . . . stopper-operating rod | 675 . . . friction pad |
| 700 . . . bead inspection unit | 710 . . . mounting bracket |
| 717 . . . beam through hole | 730 . . . vision camera |
| 731 . . . lighting unit | 750 . . . second profile sensor |

While this disclosure has been described in connection with what is presently considered to be practical exemplary forms, it is to be understood that the disclosure is not limited to the disclosed forms, but, on the contrary, is intended to cover various modifications and equivalent arrangements included within the spirit and scope of the appended claims.

What is claimed is:

1. A side panel home-positioning jig for a roof laser-brazing system that is configured with a predetermined brazing section and a predetermined grinding section along a transferring path of a body and configured to bond a roof panel to a side panel of the body, the side panel home-positioning jig configured to hold and home-position the side panel and comprising:
    a base frame configured to be installed in the brazing section at one of opposite sides of the transferring path between which the transferring path extends;
    a moving frame configured to be reciprocally and slidably movable in a width direction of the body;
    a post frame disposed in a direction perpendicular to opposite sides of the moving frame;
    a support frame installed at the post frame along a length direction of the side panel;
    a plurality of clampers mounted on the support frame along the transfer direction of the body, the plurality of clampers configured to be reciprocally movable in the width direction of the body, and to hold the corresponding side panel; and
    a fixing pin installed at the post frame and configured to fix a roof-pressing jig of the roof laser-brazing system.

2. The side panel home-positioning jig of claim 1, wherein the side panel home-positioning jig is further configured to adjust the home-positioning of the side panel based on a detected matching gap between the roof panel and the side panel such that the side panel home-positioning jig provide a zero gap between the side panel and the roof panel.

3. The side panel home-positioning jig of claim 1, wherein the moving frame is configured to be slidably movable in a plurality of guide rails provided in the base frame.

4. The side panel home-positioning jig of claim 1, wherein a first driving part is installed at the base frame and is configured to reciprocally move the moving frame in the width direction of the body.

5. The side panel home-positioning jig of claim 4, wherein the first driving part comprises:
   a first servo motor fixedly mounted on the base frame; and
   a lead screw that is connected to the first servo motor and is substantially threadedly-fixed to the moving frame.

6. The side panel home-positioning jig of claim 1, wherein the support frame is rotatably installed at the post frame through a drive motor.

7. The side panel home-positioning jig of claim 1, wherein the clampers are configured to be reciprocally moved in the width direction of the body by a second driving part provided in the support frame.

8. The side panel home-positioning jig of claim 7, wherein the second driving part comprises:
   a second servo motor installed at the support frame; and
   a linear motion (LM) guide that is connected to the second servo motor, configured to fix the clamper, and configured to be reciprocally movable in the width direction of the body by the second servo motor.

9. The side panel home-positioning jig of claim 1, wherein a pin clamper configured to hold a pin connection portion of the roof-pressing jig is installed at the post frame.

10. The side panel home-positioning jig of claim 9, wherein a support bracket configured to dock with the roof-pressing jig is installed at the post frame.

\* \* \* \* \*